US008111947B2

(12) United States Patent
Sato et al.

(10) Patent No.: US 8,111,947 B2
(45) Date of Patent: Feb. 7, 2012

(54) IMAGE PROCESSING APPARATUS AND METHOD WHICH MATCH TWO IMAGES BASED ON A SHIFT VECTOR

(75) Inventors: Makoto Sato, Setagaya-ku (JP); Muling Guo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1183 days.

(21) Appl. No.: 11/569,526

(22) PCT Filed: Jun. 3, 2005

(86) PCT No.: PCT/JP2005/010631
§ 371 (c)(1),
(2), (4) Date: Nov. 22, 2006

(87) PCT Pub. No.: WO2005/120352
PCT Pub. Date: Dec. 22, 2005

(65) Prior Publication Data
US 2007/0260137 A1 Nov. 8, 2007

(30) Foreign Application Priority Data

Jun. 8, 2004 (JP) .............................. 2004-0170231
Jan. 28, 2005 (JP) ................................ 2005-021827

(51) Int. Cl.
*G06K 9/32* (2006.01)

(52) U.S. Cl. ........ 382/294; 382/128; 382/130; 382/209; 382/276; 382/293; 345/629

(58) Field of Classification Search .................. None
See application file for complete search history.

(56) References Cited

U.S. PATENT DOCUMENTS

| 5,359,513 | A |   | 10/1994 | Kano et al. ............... 364/413.23 |
| 5,790,690 | A |   | 8/1998 | Doi et al. ...................... 382/128 |
| 5,982,915 | A | * | 11/1999 | Doi et al. ...................... 382/130 |
| 5,982,953 | A | * | 11/1999 | Yanagita et al. .............. 382/294 |
| 6,011,862 | A |   | 1/2000 | Doi et al. ...................... 382/132 |
| 6,067,373 | A | * | 5/2000 | Ishida et al. .................. 382/130 |
| 6,434,279 | B1 |   | 8/2002 | Shiba ............................ 382/294 |
| 6,594,378 | B1 | * | 7/2003 | Li et al. ........................ 382/128 |

(Continued)

FOREIGN PATENT DOCUMENTS

JP        7-37074       2/1995

(Continued)

OTHER PUBLICATIONS

International Search Report mailed Jul. 27, 2005, for corresponding Int'l Appln. No. PCT/JP2005/010631.

(Continued)

*Primary Examiner* — Sath V Perungavoor
*Assistant Examiner* — Jason Heidemann
(74) *Attorney, Agent, or Firm* — Fitzpatrick, Cella, Harper & Scinto

(57) ABSTRACT

The present invention aims to provide image processing device and method capable of generating a difference image at high speed without occurring misregistration. To achieve this, in the image processing device and method, plural regions of interest are set respectively to input first and second images, a shift vector indicating a misregistration amount between the first and second images is calculated with respect to each of the regions of interest, a filter process is executed to the shift vector, the filter-processed shift vector is interpolated, the first and second images are registered based on the interpolated shift vector, and a subtraction operation is executed between corresponding pixels on the respective registered images to acquire the difference image.

13 Claims, 27 Drawing Sheets

U.S. PATENT DOCUMENTS

| | | | |
|---|---|---|---|
| 6,647,132 B1 | 11/2003 | Montillo et al. | 382/108 |
| 6,915,003 B2 | 7/2005 | Oosawa | 382/130 |
| 2001/0048757 A1 | 12/2001 | Oosawa | 382/130 |
| 2002/0048393 A1* | 4/2002 | Oosawa | 382/132 |
| 2003/0161520 A1* | 8/2003 | Yamano et al. | 382/128 |
| 2004/0172292 A1 | 9/2004 | Takekoshi et al. | 705/2 |
| 2008/0292174 A1 | 11/2008 | Sato | 382/132 |

FOREIGN PATENT DOCUMENTS

| | | |
|---|---|---|
| JP | 8-335271 | 12/1996 |
| JP | 2000-342558 A | 12/2000 |
| JP | 2002-32735 | 1/2002 |
| JP | 2003-153877 A | 5/2003 |
| JP | 2004-164298 A | 11/2006 |

OTHER PUBLICATIONS

Written Opinion mailed Jul. 27, 2005, for corresponding Int'l Appln. No. PCT/JP2005/010631.

CL Gilchrist et al., "High-Resolution Determination of Soft Tissue Deformations Using MRI and First-Order Texture Correlation", *IEEE Transactions on Medical Imaging*, vol. 23, No. 5, 1pp. 546-553 (2004).

Wolberg, G., "Digital Image Warping", IEEE Computer Society Press, 1990, pp. 133 and 134.

"Image Analysis Handbook," University of Tokyo Press, pp. 708-709.

* cited by examiner

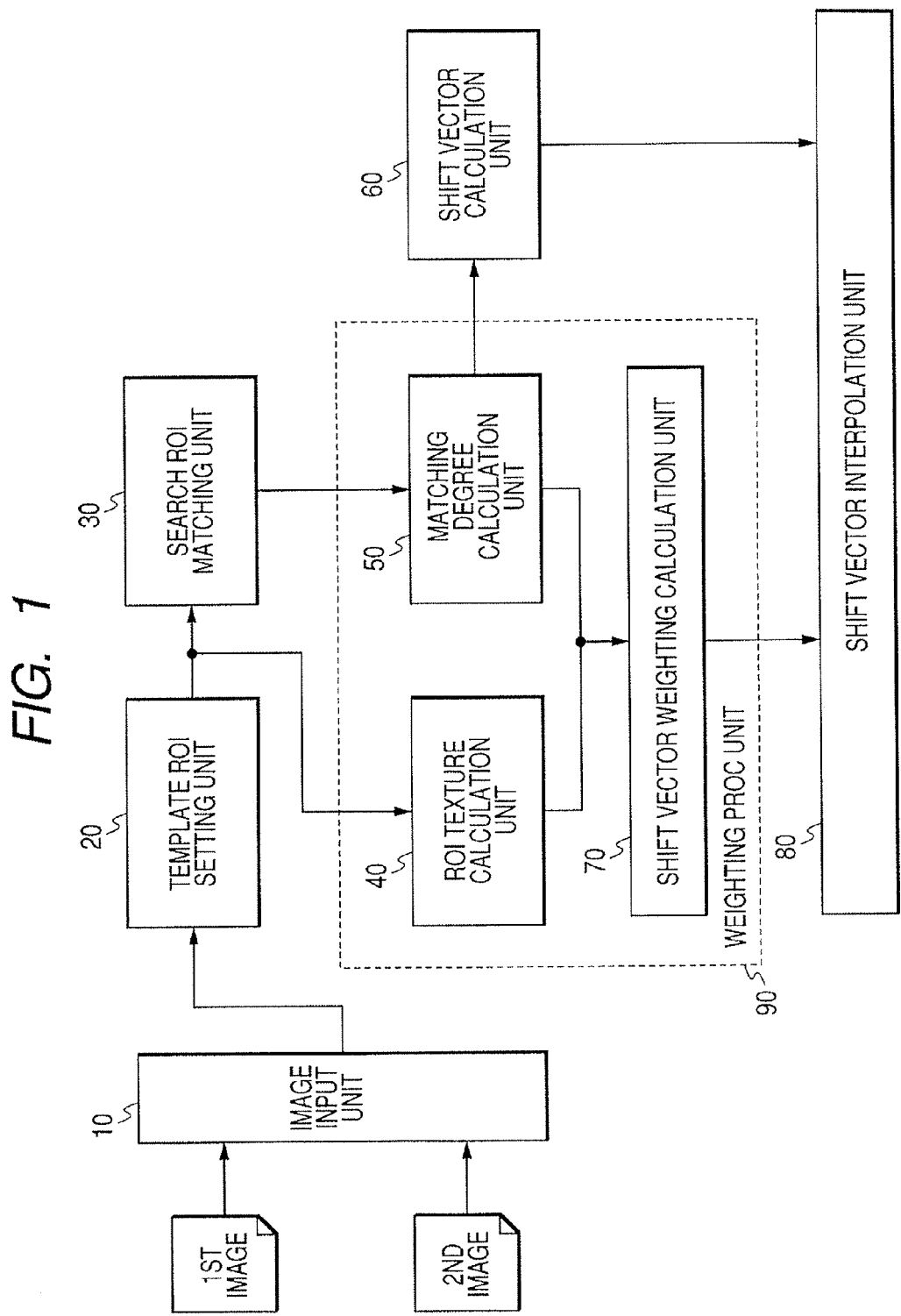

ROI OF LUNG FIELD EDGE

ROI OF LUNG FIELD CENTER

ROI OF MEDIASTINUM

ROI OF DIAPHRAGM

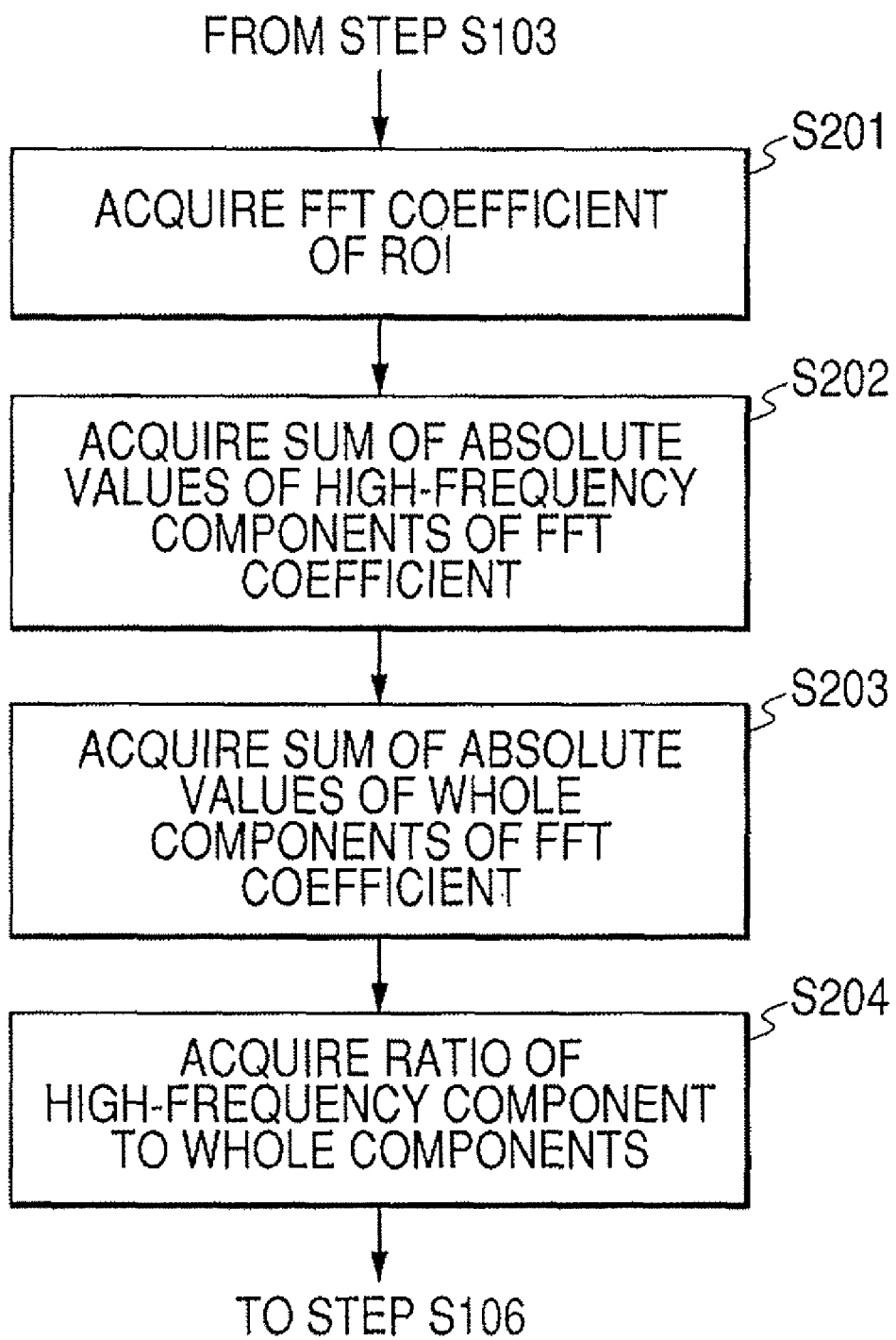

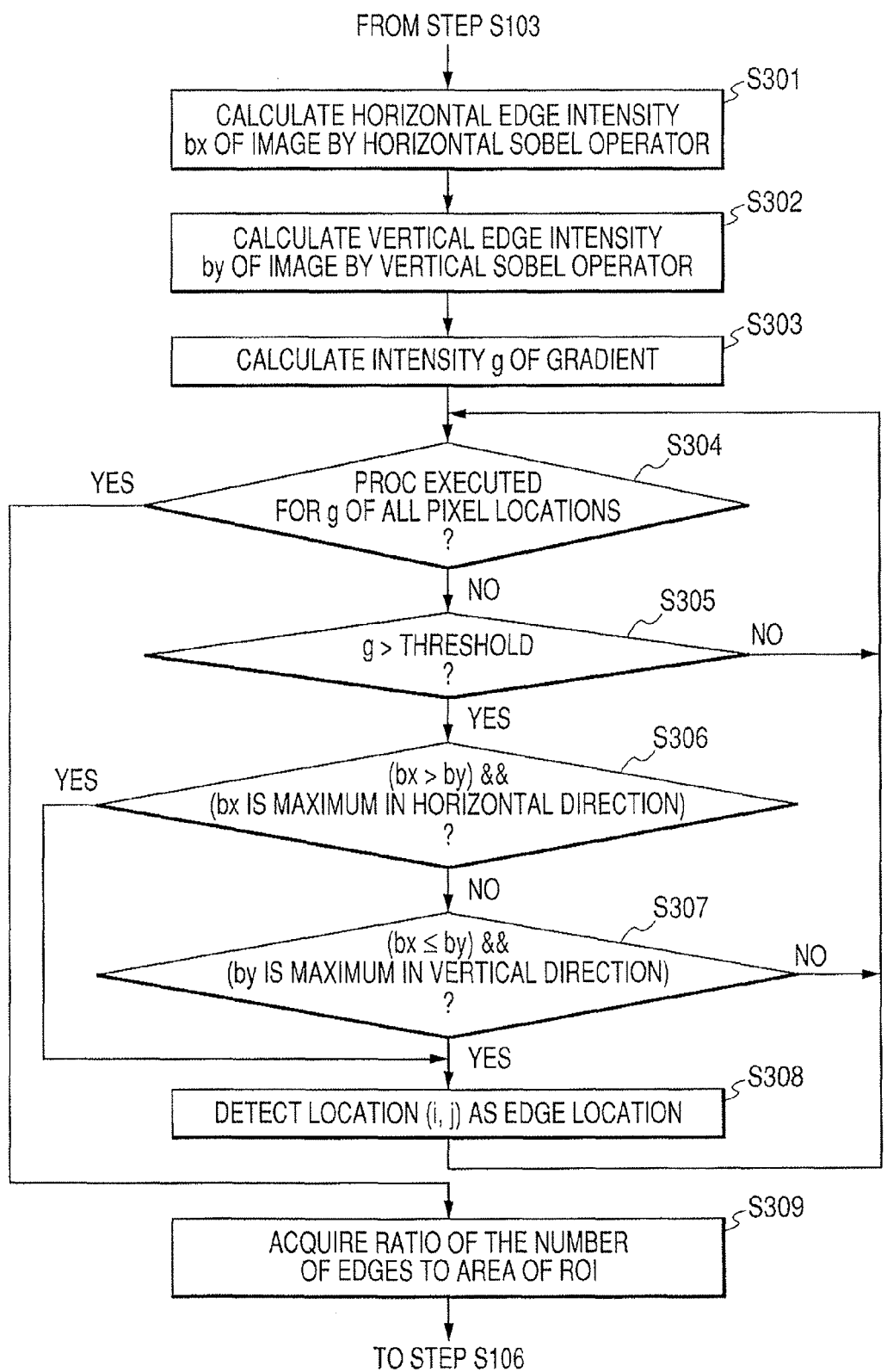

SOBEL

EDGE OF ROI OF LUNG
FIELD EDGE

SOBEL

EDGE OF ROI OF LUNG
FIELD CENTER

SOBEL

EDGE OF ROI OF
MEDIASTINUM

SOBEL

EDGE OF ROI OF
DIAPHRAGM $v_0^1 = [\ dx_0^1\ \ dy_0^1\ ]^t$  $v_1^1 = [\ dx_1^1\ \ dy_1^1\ ]^t$ $v_{24}^1 = [\ dx_{24}^1\ \ dy_{24}^1\ ]^t$

IMAGE PROCESSING APPARATUS AND METHOD WHICH MATCH TWO IMAGES BASED ON A SHIFT VECTOR

TECHNICAL FIELD

The present invention relates to image processing device and method which are suitable for registration of two images being the target of a process such as a difference process or the like in CAD (computer aided diagnosis) technique or the like using medical images.

BACKGROUND ART

In recent years, use of digital images is advanced in the field of CAD. Therefore, by digitizing a medical image, a possibility of diagnostic form which was difficult in conventional diagnosis using silver salt photograph comes out.

More specifically, in the conventional diagnosis, in a case where plural X-ray photographs which were taken at different points in time during observation of patient's condition are compared for diagnosis, the films on which the X-ray photographs have been respectively developed are generally hung on a light box (schaukasten), and the hung films are actually compared and read.

Meanwhile, in the case where the digital images are used in the diagnosis, the two digital images which were taken at different points in time with respect to one patient are subjected to registration so that the normal anatomical structure on one digital image conforms to that of the other digital image, and then a subtraction process is executed to the two digital images, whereby a difference image is generated and output. Subsequently, the output difference image is compared with the pair of the two original digital images, whereby it is possible to more accurately grasp a change between the two original images.

Such a difference image generation method is disclosed in, for example, Japanese Patent Application Laid-Open No. H07-037074 which corresponds to U.S. Pat. No. 5,359,513 and is called the document 1 hereinafter. That is, according to the generation method disclosed in the document 1, two chest X-ray images respectively taken at different points in time are subjected to registration, and a difference image can be generated. Here, it should be noted that such a subtraction process is called a temporal subtraction process.

Subsequently, the schematic constitution of the device which achieves the temporal subtraction process as disclosed in the document 1 will be explained with reference to FIG. 25.

In FIG. 25, first, a pair of medical digital images input by an image input unit 1 is subjected to a density correction process by a pre-processing unit 11, and is then input to an ROI (region of interest) matching unit 12. In the ROI matching unit 12, a matching process is executed with respect to plural set ROI's (regions of interest) by calculating a cross-correlation coefficient, and a shift vector which indicates a displacement amount in the pair of the medical digital images (two images) is calculated with respect to each ROI.

Then, in a polynomial interpolation unit 13, the calculated shift vector is subjected to approximate interpolation by a two-dimensional n-degree polynomial. Subsequently, in a registration unit 5, non-linear distortion is applied to either one of the two images. Moreover, in a subtraction operation unit 6, subtraction is executed between the pixels at the corresponding locations, whereby a difference signal is generated. After then, in a post-processing unit 7, a post-process including a gradation process and the like is executed to the difference signal, and the processed signal is output to an output unit 8.

Incidentally, a temporal subtraction technique for a chest X-ray image is the technique for dealing with first and second images of a common subject which is a part of a human body taken at different points in time. More specifically, the temporal subtraction technique corrects deformation of a lung field which occurs due to various factors such as forward-and-backward and rightward-and-leftward movements of the subject, breath of the subject, a change of an X-ray tube irradiation angle, and the like, executes a subtraction process, and then extracts the portions including changes as a difference image from the two images. By applying the above temporal subtraction technique, it is possible to extract the image components corresponding to only a change of the seat of a disease from the first and second images as taking no account of the common normal tissues such as bones, blood vessels and the like. Consequently, particularly in a temporal subtraction CAD technique, it is possible to clinically expect early detection of lesion, early detection of the seat of a disease hidden behind the normal constitutions such as rib bones, blood vessels and the like, prevention of oversight of lesion, and rapid interpretation of radiogram.

In any case, the main factor of the temporal subtraction technique is a registration technique for correcting the deformation occurring between the first and second images. By the way, Japanese Patent Application Laid-Open No. 2002-032735 which corresponds to U.S. Publication No. 2001048757 and is called the document 2 hereinafter discloses the conventional temporal subtraction technique. More specifically, in the conventional temporal subtraction technique like this, the process as shown in FIG. 26 is executed. That is, the first image (original image or past image) and the second image (current image) are first read, and then a template ROI is uniformly set within the region of a lung field of the first image. Subsequently, in the second image, a search ROI is set at the location corresponding to the template ROI of the first image. At this time, in the search ROI of the second image, the location corresponding to the center of the template ROI of the first image is searched, and the transition from the center of the template ROI of the first image to the relevant location in the search ROI of the second image is recorded as the shift vector.

In case of actually recording the shift vector, the coordinates of the center of the template ROI and the transition from the center of the template ROI to the relevant location in the search ROI are recorded. Typically, in case of achieving conformation (matching) of the ROI's, a degree of matching is used as the weight of the shift vector. Then, ordinarily, in case of achieving the matching by using cross-correlation of the ROI's a correlation coefficient itself is used as the weight of the shift vector as it is. Besides, in case of achieving the matching by using an SSDA (Sequential Similarity Detection Algorithm), the result acquired by calculating and normalizing an inverse number of a residual error is used as the weight of the shift vector. After then, interpolation with use of a polynomial is executed to the shift vector by using the acquired weight, and the second image is warped to the first image to acquire the difference.

However, in the above document 1, when the shift vector acquired by executing the matching (ROI matching) with respect to each of many ROI's is interpolated by polynomial approximation, the coefficient of the polynomial is determined by a method of least squares or the like. For this reason, there is a technical problem that it takes a long time to execute such a process.

Moreover, in the ROI matching, if plural similar patterns exist in the subject, there is a limit in accuracy of the matching. Consequently, according to circumstances, it is impossible to avoid including a serious error in the shift vector. In such a case, if the shift vector is interpolated by using the method of least squares, the included error influences other shift vectors, whereby displacement or misregistration occurs entirely. For this reason, there is a technical problem that noise components increase in the difference image.

Incidentally, as described below, a chest simple X-ray photograph includes various regions of which the information amounts are different from others.

That is, a clavicle and a body border portion, while the gradation information is poor or simple, the edge information is wealthy. In a lung field edge portion, both the gradation information and the edge information are wealthy. Besides, in a heart and a diaphragm, both the gradation information and the edge information are simple or poor. Thus, for example, in the document 2, when the matching is executed by using the ROI of which the gradation information or the edge information is poor, it cannot necessarily be said that the matching of the ROI is accurately executed even if the weight of its shift vector is high, and it is impossible in this case to judge whether or not the information of the shift vector is correct. For this reason, there is a technical problem that it negatively influences subsequent processes.

In addition, with respect to the shift vector of the ROI of which the texture including the gradation information, the edge information and the like is wealthy, it is desirable to execute the interpolation with accuracy higher than that for the shift vector of the ROI of which the texture is low, whereby more accurate shift vector interpolation is necessary.

DISCLOSURE OF THE INVENTION

The present invention is completed to solve the above technical problems, and the object thereof is to provide image processing device and method which can generate a difference image at high speed as relatively decreasing misregistration, and a program which is used by a computer to achieve the above image processing method.

An image processing device according to the present invention for achieving the above object is characterized by an image processing device which matches a second image to a first image based on a shift vector, comprising:

a matching degree acquisition unit adapted to acquire a degree of matching of corresponding points corresponding mutually between the first and second images;

a texture estimation unit adapted to estimate a texture on the periphery of the corresponding points; and a shift vector weighting unit adapted to weight the shift vector based on the degree of matching and the estimation of the texture.

An image processing method according to the present invention for achieving the above object is characterized by an image processing method which matches a second image to a first image based on a shift vector, comprising:

a matching degree acquisition step of acquiring a degree of matching of corresponding points corresponding mutually between the first and second images;

a texture estimation step of estimating a texture on the periphery of the corresponding points; and a shift vector weighting step of weighting the shift vector based on the degree of matching and the estimation of the texture.

An image processing device according to the present invention for achieving the above object is characterized by an image processing device which outputs a difference image between a first image and a second image, comprising:

an input unit adapted to input the first image and the second image;

a shift vector calculation unit adapted to set plural regions of interest respectively to the first image and the second image, and calculate a shift vector indicating a misregistration amount between the first image and the second image with respect to each of the regions of interest;

a filter unit adapted to execute a filter process to the shift vector;

an interpolation unit adapted to interpolate the shift vector subjected to the filter process by the filter unit;

a registration unit adapted to register the first image and the second image based on the shift vector interpolated by the interpolation unit;

a subtraction operation unit adapted to execute a subtraction operation between corresponding pixels on the respective registered images; and an output unit adapted to output the difference image acquired by the subtraction operation unit.

An image processing method according to the present invention for achieving the above object is characterized by an image processing method which outputs a difference image between a first image and a second image, comprising:

an input step of inputting the first image and the second image;

a shift vector calculation step of setting plural regions of interest respectively to the first image and the second image, and calculating a shift vector indicating a misregistration amount between the first image and the second image with respect to each of the regions of interest;

a filter step of executing a filter process to the shift vector;

an interpolation step of interpolating the shift vector subjected to the filter process in the filter step;

a registration step of registering the first image and the second image based on the shift vector interpolated in the interpolation step;

a subtraction operation step of executing a subtraction operation between corresponding pixels on the respective registered images; and an output step of outputting the difference image acquired in the subtraction operation step.

BRIEF DESCRIPTION OF THE DRAWINGS

FIG. 1 is a functional block diagram showing the functional constitution of a medical image processing device according to the first embodiment of the present invention;

FIG. 7 is a flow chart showing the operation of a medical image processing device according to the second embodiment of the present invention;

FIG. 8 is a flow chart showing the operation of a medical image processing device according to the third embodiment of the present invention;

BEST MODE FOR CARRYING OUT THE INVENTION

Figure 2A:
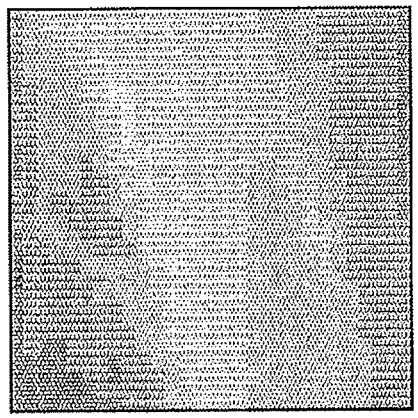
FIGS. 2A, 2B, 2C and 2D are diagrams showing images of ROI's respectively set in the edge of a lung field, the center of the lung field, a mediastinum and a diaphragm.

Hereinafter, the embodiments of the present invention will be explained concretely with reference to the attached drawings.

First Embodiment

First of all, the first embodiment of the present invention will be explained hereinafter. FIG. 1 is a functional block diagram showing the functional constitution of a medical image processing device according to the first embodiment of the present invention. Incidentally, it should be noted that the medical image processing device according to the present embodiment may be achieved by a dedicated device for achieving the functions shown in FIG. 1 or by a control program for causing a general-purpose computer to execute the later-described processes. Moreover, it should be noted that it is possible to achieve each of the function blocks shown in FIG. 1 by hardware, software, or cooperation of hardware and software.

As shown in FIG. 1, the medical image processing device according to the present embodiment is equipped with an image input unit 10, a template ROI (region of interest) setting unit 20, a search ROI matching unit 30, an ROI texture calculation unit 40, a matching degree calculation unit 50, a shift vector calculation unit 60, a shift vector weighting calculation unit 70, and a shift vector interpolation unit 80.

The image input unit 10 reads two digital images (i.e., first and second images) from an image storage unit (not shown). For example, the image input unit 10 reads the two images of the same region of an identical subject which were taken respectively at different points in time. Then, the template ROI setting unit 20 uniformly sets a template ROI in the lung field region of the first image, and the search ROI matching unit 30 sets a search ROI at the location of the second image corresponding to the template ROI of the first image. Here, it should be noted that the search ROI is set to be larger than the template ROI.

The ROI texture calculation unit 40 calculates the texture of the template ROI set by the template ROI setting unit 20. Here, it should be noted that the texture included in the template ROI is variously estimated, and a change of the pixel value in the template ROI is used as one index. For this reason, in the present embodiment, the ROI texture calculation unit 40 forms a histogram of the template ROI, and sets a pixel value number $C_i$ of non-zero count as the texture. Here, the symbol i indicates a template ROI number. In any case, by executing such a process, the texture of the template ROI set in the region of a mediastinum, a heart, a diaphragm or the like decreases. On the contrary, the texture of the template ROI set in the lung field, the lung field contour or the like increases.

Figure 2B:
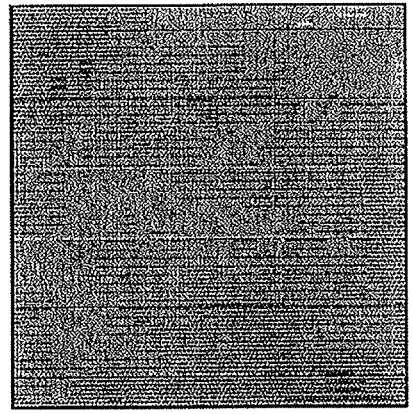
Figure 2C:
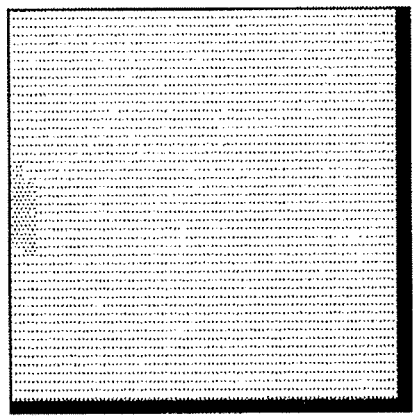
Figure 2D:
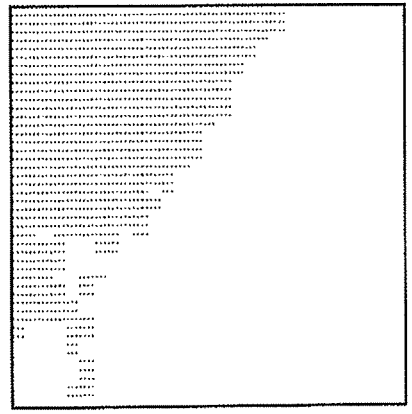
Figure 3A:
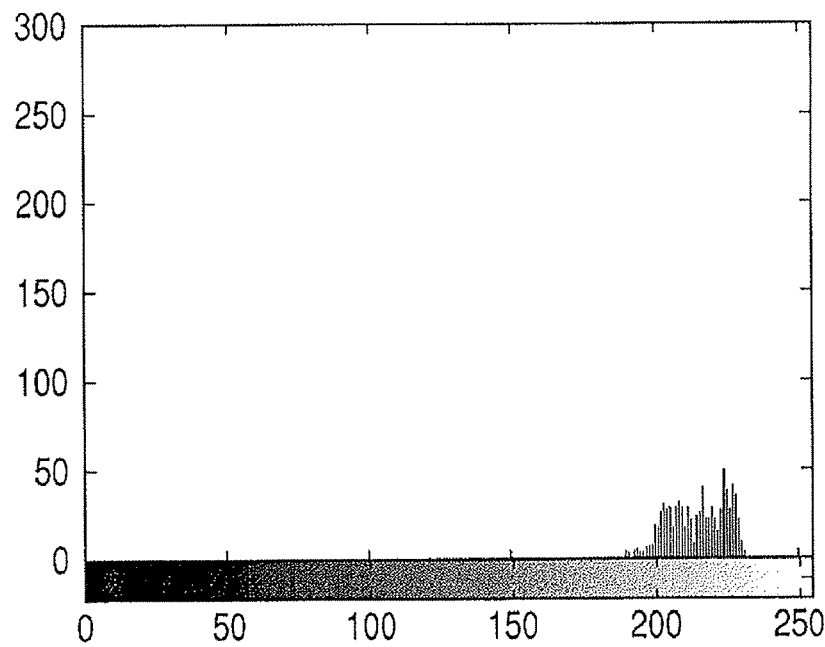
FIG. 3A is a diagram showing a histogram of the image of FIG. 2A.
Figure 3B:
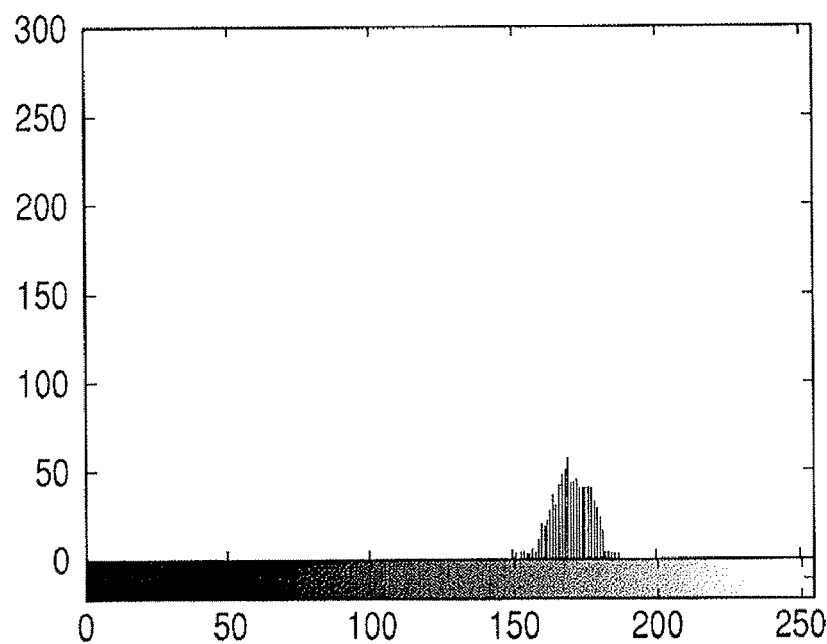
FIG. 3B is a diagram showing a histogram of the image of FIG. 2B.
Figure 3C:
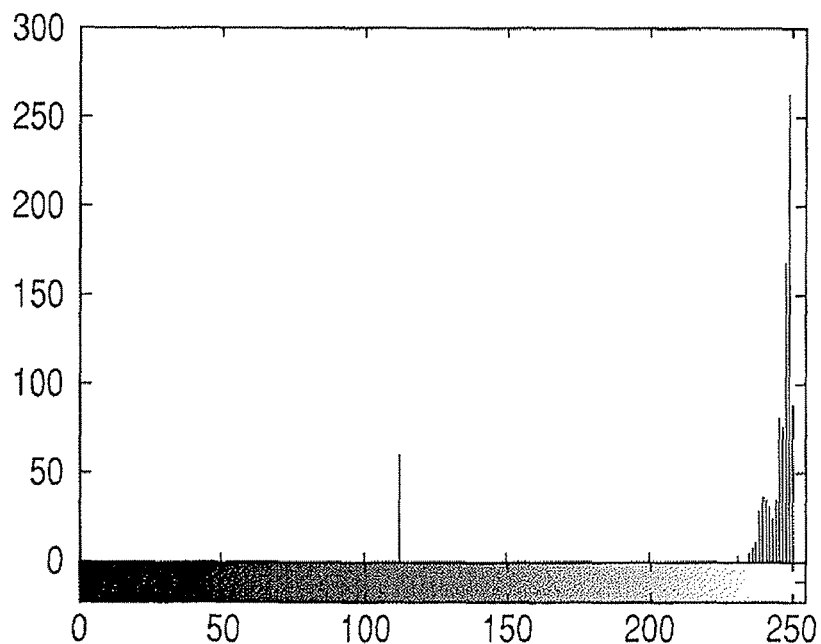
FIG. 3C is a diagram showing a histogram of the image of FIG. 2C.
Figure 3D:
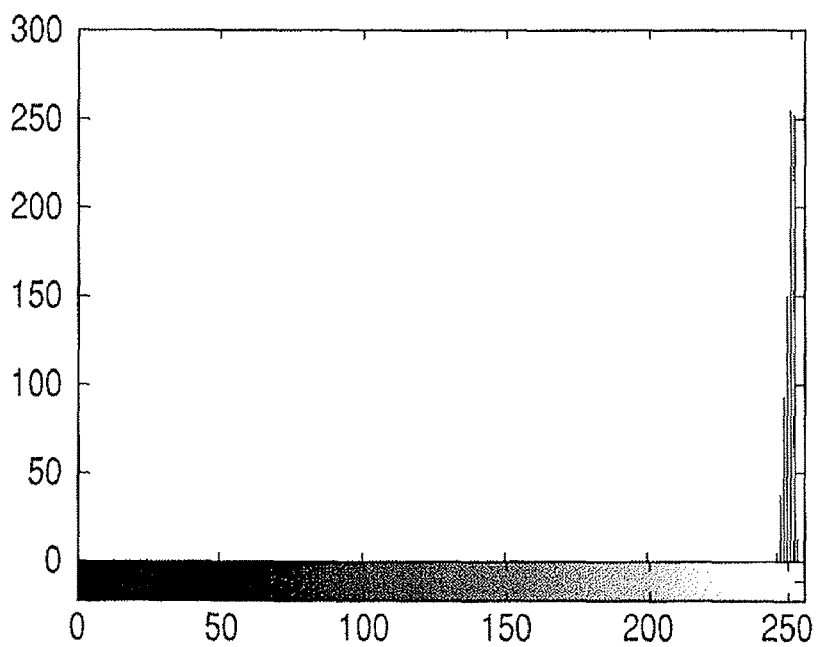
FIG. 3D is a diagram showing a histogram of the image of FIG. 2D.

FIGS. 2A, 2B, 2C and 2D are diagrams showing images (each having the data amount of 12 bits) of the template ROI's respectively set in the edge of the lung field, the center of the lung field, the mediastinum and the diaphragm, FIG. 3A is a diagram showing a histogram of the image of FIG. 2A, FIG. 3B is a diagram showing a histogram of the image of FIG. 2B, FIG. 3C is a diagram showing a histogram of the image of FIG. 2C, and FIG. 3D is a diagram showing a histogram of the image of FIG. 2D. Here, in each of FIGS. 3A to 3D, the data amount is set to eight bits. As shown in FIG. 3A, in the histogram of the template ROI set in the edge of the lung field, the pixel values of non-zero count are distributed within the width of about 50 approximately extending from 180 to 230. As shown in FIG. 3B, in the histogram of the template ROI set in the center of the lung field, the pixel values of non-zero count are distributed within the width of about 30 approximately extending from 150 to 180. On one hand, as shown in FIG. 3C, in the histogram of the template ROI set in the mediastinum, the pixel values of non-zero count are distributed only within the width of about 10 approximately extending from 240 to 250. Moreover, as shown in FIG. 3D, in the histogram of the template ROI set in the diaphragm, the pixel values of non-zero count are distributed only within the width of about 16 approximately extending from 240 to 256. Therefore, it can be understood that the reliability of the template ROI set in the edge of the lung field or the center of the lung field is higher than the reliability of the template ROI set in the mediastinum or the diaphragm.

The matching degree calculation unit 50 calculates a cross-correlation coefficient as shifting the template ROI to the search region in the second image. Here, it should be noted that the location where the cross-correlation coefficient is maximum corresponds to the center of the template ROI. Therefore, in the present embodiment, a cross-correlation coefficient $R_i$ at the center of the template ROI is used as a degree of matching.

The shift vector calculation unit 60 calculates a displacement (or misregistration) between the location where the cross-correlation coefficient is maximum in the second image and the center of the template ROI in the first image, and acquires the shift amounts in the horizontal and vertical directions as the shift vector.

The shift vector weighting calculation unit 70 calculates, with respect to each of all of the ROI's, the product of the maximum cross-correlation coefficient $R_i$ and a texture $T_i$ of the template ROI from the pixel value number $C_i$ of non-zero count of the template ROI acquired by the ROI texture calculation unit 40 and the maximum cross-correlation coefficient $R_i$ acquired by the matching degree calculation unit 50, and sets the normalized result acquired by the equation (1) to a weight wi of each ROI.

$$W_i = \frac{T_i \cdot R_i}{\sum_{i=1}^{N} T_i \cdot R_i} \quad (1)$$

Here, the symbol N is the number of the ROI's, and Ti=Ci is satisfied in the present embodiment.

Figure 4:
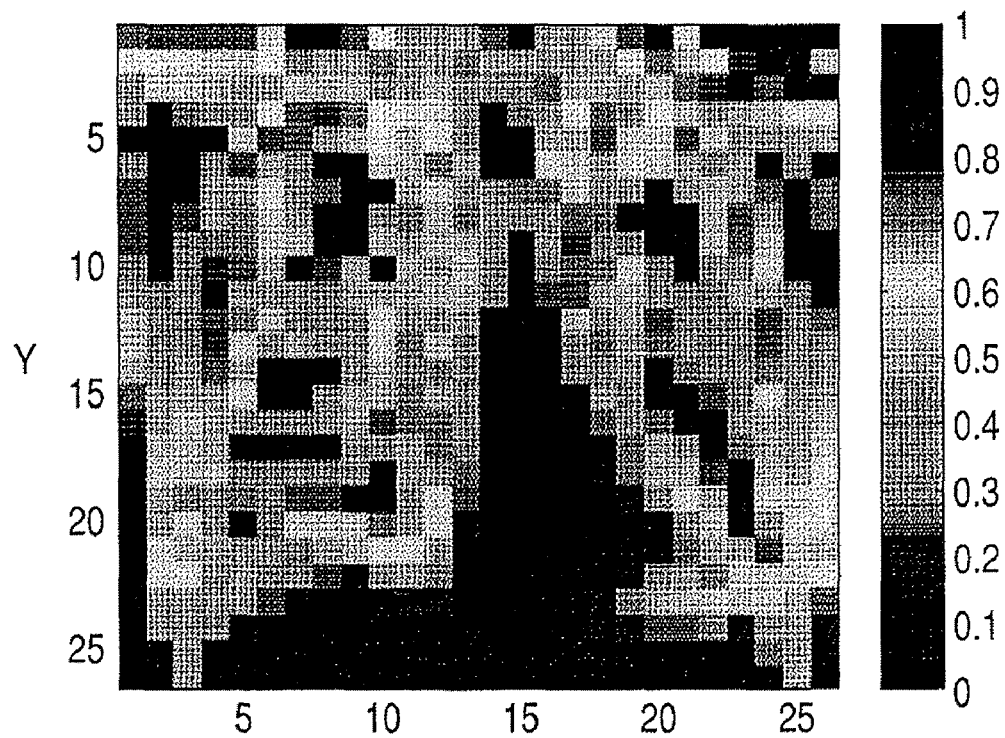
FIG. 4 is a diagram showing an example of a weight of the sift vector acquired by a weighting processing unit 90.
Figure 26:
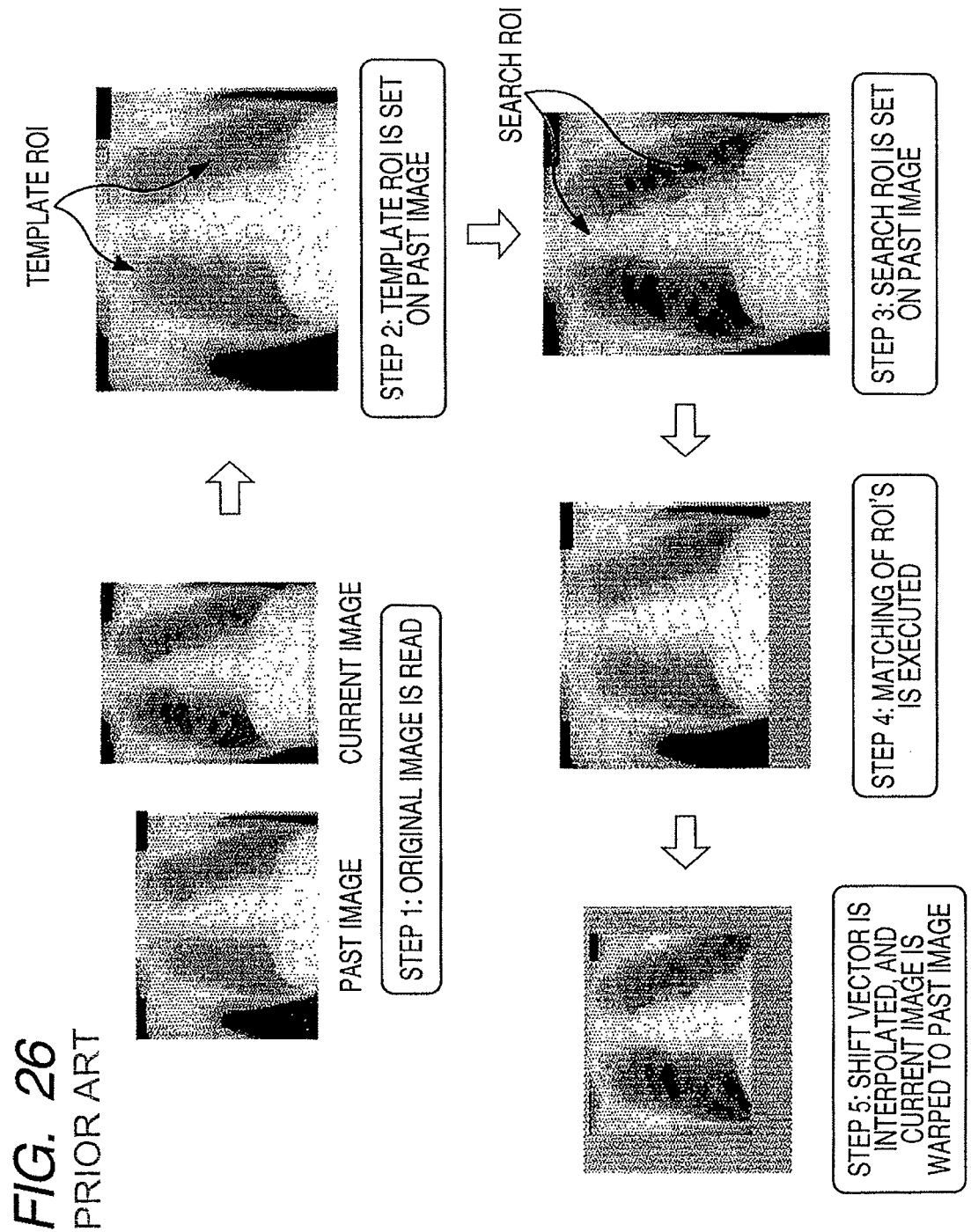
FIG. 26 is a diagram showing a conventional image processing method.

In the present embodiment, the ROI texture calculation unit 40, the matching degree calculation unit 50 and the shift vector weighting calculation unit 70 together constitute a weighting processing unit 90 (FIG. 1). In this connection, FIG. 4 shows an example of the weight of the shift vector acquired by the weighting processing unit 90. Here, it should be noted that the example shown in FIG. 4 is acquired from the general X-ray photographs as shown in FIG. 26. As shown in FIG. 4, the shift vector of the ROI set nearby the edge of the rib cage field has larger weight, and the shift vectors of the ROI's set nearby the center of the lung field, the mediastinum, the heart, the abdomen and the like have smaller weight.

The shift vector interpolation unit 80 executes polynomial interpolation of the weight of the shift vector acquired by the shift vector weighting calculation unit 70 and the shift vector calculated by the shift vector calculation unit 60. Thus, the deformation from the first image to the second image is indicated by one 2 dimensional polynomial, the second image is warped to the first image by the subsequent process, and then the subtraction process between the first image and the second image is executed to acquire a difference image.

Figure 5:
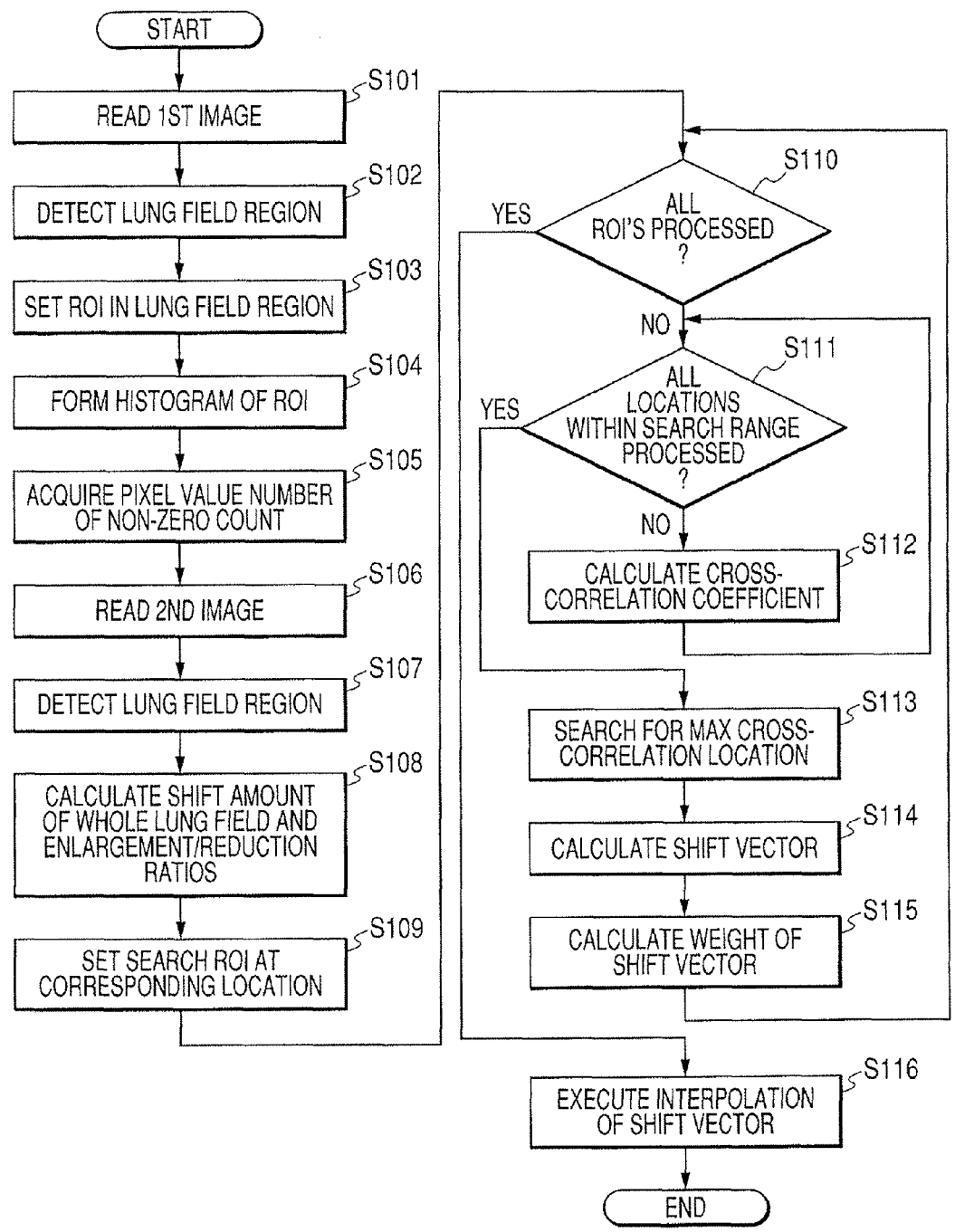
FIG. 5 is a flow chart showing the operation of the medical image processing device according to the first embodiment of the present invention.

Subsequently, the operation of the medical image processing device constituted as above will be explained hereinafter. FIG. 5 is a flow chart showing the operation of the medical image processing device according to the first embodiment of the present invention.

Figure 6:
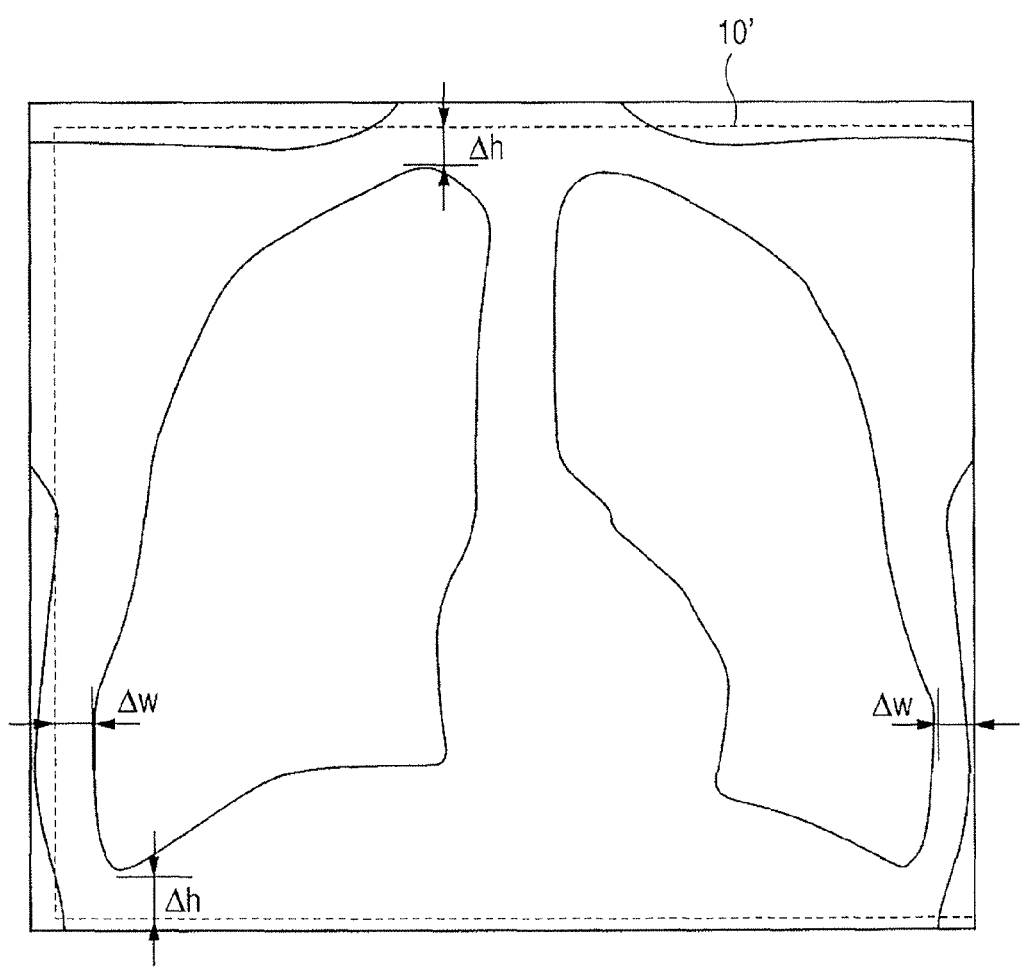
FIG. 6 is a typical diagram showing the edge of the lung field detected through an ordinary chest simple radiograph.
Figure 9A:
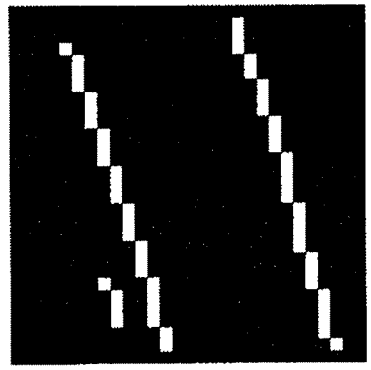
FIGS. 9A, 9B, 9C and 9D are diagrams respectively showing the edge detection results in the third embodiment.
Figure 9B:
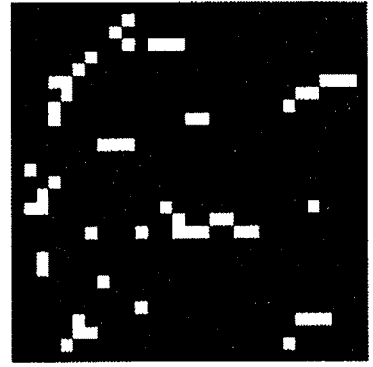
Figure 9C:
Figure 9D:
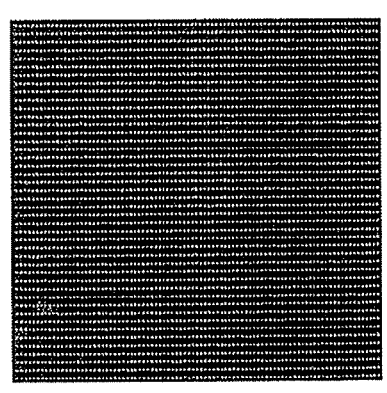

In the present embodiment, first, the image input unit 10 reads the first image from a not-shown image storage unit into a memory (step S101). Then, the edge of the lung field is detected in the first image, and the region of the lung field is set (step S102). FIG. 6 is a typical diagram showing the edge of the lung field detected through an ordinary chest simple radiograph. In FIG. 6, the center of the uppermost end, the lowermost end, the leftmost end and the rightmost end of the edge is considered as the center of the lung field, and the rectangular region expanding from the uppermost end and the lowermost end by a distance Δh and from the leftmost end and the rightmost end by a distance Δw is considered as a region 10' of the lung field. However, if the rectangular region set as above exceeds the border of image, the result which is acquired by trimming the portions exceeding the rectangular region is considered as the region 10' of the lung field.

After the region of the lung field was set, the template ROI setting unit 20 sets the template ROI by uniformly setting the template ROI centers in the region of the lung field (step S103).

Subsequently, the ROI texture calculation unit 40 forms the image histogram with respect to each set ROI according to the statistics (step S104). Then, the ROI texture calculation unit 40 acquires the pixel value number $C_i$ of non-zero count with respect to each histogram (step S105).

After then, the image input unit 10 reads the second image from the not-shown image storage unit into the memory (step S106) Subsequently, as well as the step S102, in the second image, the edge of the lung field is detected, and the center of the region of the lung field is acquired, whereby the region of the lung field is set (step S107).

Next, based on the uppermost end, the lowermost end, the leftmost end and the rightmost end of the edge of the lung field detected in each of the steps S102 and S107, a shift amount of the whole lung field between the first and second images and enlargement/reduction ratios in vertical/horizontal directions are calculated (step S108).

Subsequently, the search ROI matching unit 30 sets in the second image the location corresponding to the center of the template ROI set in the step S103, by the following equation (2). Then, the search ROI matching unit 30 sets the search ROI based on the set location (step S109).

$$x' = r_n \cdot x + \Delta H$$
$$y' = r_v \cdot y + \Delta V \quad (2)$$

Here, it should be noted that (x, y) indicates the coordinates of the center of the template ROI in the case where the center of the lung field in the first image is set as an origin, (x', y') indicates the coordinates of the center of the search ROI in the case where the center of the lung field in the second image is set as an origin, the symbol ΔH indicates the whole shift amount of the center of the lung field in the horizontal direction, the symbol ΔV indicates the whole shift amount of the center of the lung field in the vertical direction, the symbol rh indicates the enlargement/reduction ratios in the horizontal direction, and the symbol $r_v$ indicates the enlargement/reduction ratios in the vertical direction.

Next, it is judged whether or not the processes in later-described steps S111, S112, S113, S114 and S115 are executed to all the ROI's (step S110). If it is judged that these processes are executed to all the ROI's, the flow advances to a step S116. Meanwhile, if it is judged that the ROI to which these processes are not executed exists, the flow advances to the step S111.

In the step S111, it is judged whether or not the process in the subsequent step S112 is executed to all the locations in the search range. If it is judged that the relevant process is executed to all the locations, the flow advances to the step S113. Meanwhile, if it is judged that the location to which the relevant process is not executed exists, the flow advances to the step S112.

In the step S112, the matching degree calculation unit 50 calculates the cross-correlation coefficient $R_i$ between the template ROI and the corresponding region in the search ROI.

In the step S113, the matching degree calculation unit 50 finds out the locations of the maximum cross-correlation coefficients with respect to all the search locations. Then, the shift vector calculation unit 60 calculates the shift vectors based on the locations found out in the step S113 (step S114). Subsequently, with respect to all the search locations, the weights of the shift vectors are respectively calculated according to the equation (1) by using the texture of the template ROI acquired in the step S105 and the maximum cross-correlation coefficient acquired in the step S113 (step S115).

Then, the shift vector interpolation unit 80 executes the interpolation by using all the shift vectors (step S116). Subsequently, the subtraction process between the first image and the second image is executed.

According to the first embodiment as described above, the weight to be given to the shift vector of the ROI of which the texture is wealthy is higher than the weight to be given to the shift vector of the ROI of which the texture is poor, whereby the interpolation can be executed more accurately as compared with the related background art. For this reason, for example, it is possible to increase accuracy of the registration between the two images respectively taken at different points in time.

Here, it should be noted that the processing order in the first embodiment is not limited to that shown in the flow chart of FIG. 5. That is, the function of the present embodiment may be achieved by another procedure. Moreover, it should be noted that the equation (1) can be applied in the case where the areas of the template ROI's are all uniform. That is, in a case where the areas of the ROI's are different respectively, the normalization can be executed by using the equation (3).

$$W_i = \frac{T_i \cdot R_i / S_i}{\sum_{i=1}^{N} (T_i \cdot R_i / S_i)} \quad (3)$$

Here, the symbol $S_i$ is the area of the i-th ROI, and, as well as the equation (1), Ti=Ci is satisfied in the present embodiment.

Besides, in addition to the pixel value number $C_i$ of non-zero count of the histogram of the ROI, dispersion of the pixel values, kurtosis of the histogram, and the like may be weighted and added to the texture.

Second Embodiment

Subsequently, the second embodiment of the present invention will be explained hereinafter. In the second embodiment, it should be noted that the functional blocks are basically the same as those in the first embodiment, but only the function of the ROI texture calculation unit 40 is different from that in the first embodiment. FIG. 7 is a flow chart showing the operation of a medical image processing device according to the second embodiment of the present invention.

In the present embodiment, after the ROI was set with respect to the first image (step S103) as well as the first embodiment, an FFT (Fast Fourier Transform) coefficient is acquired by the equation (4) (step S201).

$$F(p, q) = \sum_{m=0}^{M-1} \sum_{n=0}^{N-1} I(m, n) e^{-j(2\pi/M)pm} e^{-j(2\pi/N)qn} \quad (4)$$

where p=0, 1, . . . , M−1, and q=0, 1, . . . , N−1

Here, the symbol M indicates the number of horizontal pixels of the template ROI, and the symbol N indicates the number of vertical pixel of the template ROI.

Next, with respect to the FFT coefficient, the sum $SH_i$ of the absolute values of the high-frequency components except for the frequency components of p=0, 1, . . . , M/2 and q=0, 1, . . . , N/2 is acquired (step S202). Here, the symbol i indicates an ROI number.

$$SH_i = \sum_{p=0}^{M/2} \sum_{N/2+1}^{N} |F(p, q)| + \sum_{P=M/2+1}^{M} \sum_{q=0}^{N} |F(p, q)| \quad (5)$$

Subsequently, as indicated by the equation (6), the sum $SA_i$ of the absolute values of the whole frequency components is acquired by adding the absolute value of the frequency component of the upper left region to the sum $SH_i$ (step S203)

$$SA_i = \sum_{p=0}^{M} \sum_{q=0}^{N} |F(p, q)| \quad (6)$$

After then, the value of a ratio $Ra_i$ is acquired by the equation (7), and the acquired value is set to the texture of the ROI (step S204).

$$Ra_i = \frac{SH_i}{SA_i} \times 100\% \quad (7)$$

In any case, in the ordinary chest simple radiograph, each high-frequency component ratio Ra of the ROI of the edge of the lung field, the ROI of the center of the lung field, the ROI of the mediastinum and the ROI of the diaphragm is as follows.

the ROI of the edge of the lung field: 20.73%
the ROI of the center of the lung field: 23.81%
the ROI of the mediastinum: 6.22%
the ROI of the diaphragm: 3.33%

As above, the ROI set in the edge of the lung field or the center of the lung field includes the higher texture.

After then, as well as the first embodiment, the processes in the step S106 and the following steps are executed. However, when the normalization is executed by using the equation (1), the weight of the shift vector is calculated under the condition that $T_i = Ra_i$.

As described above, in the second embodiment, the FFT (Fast Fourier Transform) coefficient of the ROI is acquired, and the ratio of the high-frequency component to the whole components is set to the texture of the ROI. Therefore, as well as the first embodiment, the interpolation can be executed more accurately as compared with the related background art, whereby it is possible to increase accuracy of the registration between the two images respectively taken at different points in time.

Incidentally, in the present embodiment, the image of the ROI may be transformed by using DCT (Discrete Cosine Transform), wavelet transform or the like instead of the FFT to set the ratio of the high-frequency component to the whole frequency components to the texture. Further, in the above explanation, each of the frequencies p and q which is smaller than the predetermined value is set as the low frequency. However, each of the frequencies p and q may be set as the low frequency if (p+q) or $(p^2+q^2)^{1/2}$ is smaller than a predetermined value, so as to calculate the high-frequency component ratio Ra. Furthermore, when the sum $SH_i$ or $SA_i$ is calculated, the sum of squares of each frequency component may be used instead of the sum of the absolute values. Moreover, it is possible to acquire a ratio $Ra_L$ Of the low-frequency component to the whole frequency components of the ROI and then set "$1-Ra_L$" to the texture.

Third Embodiment

Subsequently, the third embodiment of the present invention will be explained hereinafter. In the third embodiment, it should be noted that the functional blocks are basically the same as those in the first embodiment, but only the function of the ROI texture calculation unit 40 is different from that in the first and second embodiments. FIG. 8 is a flow chart showing the operation of a medical image processing device according to the third embodiment of the present invention.

In the present embodiment, after the ROI was set with respect to the first image (step S103) as well as the first embodiment, a horizontal Sobel operator as indicated by the equation (8) is multiplied to the ROI, and thus horizontal edge intensity bx(i, j) of the image at the location (i, j) is calculated (step S301). Then, the horizontal Sobel operator as indicated by the equation (8) is multiplied to the ROI, and thus vertical edge intensity by(i, j) of the image at the location (i, j) is calculated (step S302).

$$\text{horizontal Sobel operator} \quad \begin{matrix} -1 & 0 & 1 \\ -2 & 0 & 2 \\ -1 & 0 & 1 \end{matrix} \quad (8)$$

$$\text{vertical Sobel operator} \quad \begin{matrix} -1 & -2 & -1 \\ 0 & 0 & 0 \\ 1 & 2 & 1 \end{matrix}$$

Subsequently, intensity g(i, j) of the gradient of the image at the location (i, j) is calculated based on the horizontal edge intensity bx(i, j) and the vertical edge intensity by(i, j) of the image at the location (i, j) (step S303).

$$g^2(i,j) = bx^2(i,j) + by^2(i,j) \quad (9)$$

After then, it is judged whether or not the processes in later-described steps S305, S306, S307 and S308 are executed to all the pixel locations (step S304). If it is judged that these processes are executed to all the pixel locations, the flow advances to a step S309. Meanwhile, if it is judged that the pixel location to which these processes are not executed exists, the flow advances to the step S305.

In the step S305, it is judged whether or not the intensity g(i, j) of the gradient is larger than a predetermined threshold. If it is judged that the intensity g(i, j) is larger than the predetermined threshold, the flow advances to the step S306. Meanwhile, if it is judged that the intensity g(i, j) is equal to or smaller than the predetermined threshold, the flow returns to the step S304.

In the step S306, if bx(i, j)>by(i, j), it is judged that the edge is the horizontal edge. Besides, it is further judged whether or not the horizontal edge intensity bx(i, j) is maximum. If bx(i, j)>by(i, j) is satisfied and the horizontal edge intensity bx(i, j) is maximum, the flow advances to the step S308. Meanwhile, if bx(i, j)>by(i, j) is not satisfied or the horizontal edge intensity bx(i, j) is not maximum, the flow advances to the step S307.

In the step S307, if by(i, j)>bx(i, j), it is judged that the edge is the vertical edge. Besides, it is further judged whether or not the vertical edge intensity by(i, j) is maximum. If by(i, j)>bx(i, j) is satisfied and the vertical edge intensity by(i, j) is maximum, the flow advances to the step S308. Meanwhile, if by(i, j)>bx(i, j) is not satisfied or the vertical edge intensity by(i, j) is not maximum, the flow returns to the step S304.

Then, in the step S308, the location (i, j) is detected as the edge (step S304), and the flow returns to the step S304.

Further, in the step S309, a ratio (edge ratio) Pi of the number of detected edges to the area of the ROI is calculated, and the ratio $P_i$ is set to the texture of the ROI. Here, the symbol i indicates an ROI number.

For example, in the general chest simple radiograph, the detected results of the ROI of the edge of the lung field, the ROI of the center of the lung field, the ROI of the mediastinum and the ROI of the diaphragm are shown in FIGS. 9A, 9B, 9C and 9D, respectively. Incidentally, each edge ratio Pi of these ROI's is as follows.

the ROI of the edge of the lung field: 6.66%
the ROI of the center of the lung field: 6.30%
the ROI of the mediastinum: 0.00%
the ROI of the diaphragm: 0.00%

As above, it is impossible to execute satisfactory matching with respect to the ROI set in the mediastinum or the diaphragm.

After then, as well as the first embodiment, the processes in the step S106 and the following steps are executed. However, when the normalization is executed by using the equation (1), the weight of the shift vector is calculated under the condition that $T_i=P_i$. In this case, since the weight of the shift vector of the template ROI set in the mediastinum or the diaphragm is low, the process of calculating such weight is omitted, and thus the relevant weight is not used in the calculation of the shift vector by the interpolation equation.

As described above, in the third embodiment, the edge detection is executed in each ROI, and the ratio of the edge amount to the area of the ROI is set to the texture of the ROI. Therefore, as well as the first embodiment, the interpolation can be executed more accurately as compared with the related background art, whereby it is possible to increase accuracy of the registration between the two images respectively taken at different points in time.

Incidentally, in the case where the edge detection is executed to calculate the texture of the ROI in the present embodiment, a Prewitt method, a Roberts method, a Canny method or the like may be used instead of the Sobel operator.

Moreover, in the first to third embodiments, in the case where the weight of the shift vector is calculated by the shift vector weighting calculation unit 70, the texture of the ROI may be normalized, instead of the normalization by using the equation (1), so that the weighted sum of the normalized texture and the matching degree is set to the weight of the shift vector.

Fourth Embodiment

Subsequently, the fourth embodiment of the present invention will be explained hereinafter. In the fourth embodiment, it should be noted that the functional blocks are basically the same as those in the first embodiment, but only the shift vector weighting calculation unit 70 is different from that in the first embodiment.

In the present embodiment, the shift vector weighting calculation unit 70 detects the rib cage (or thorax), gives a large weight to the ROI set nearby the rib cage, and gives small weights to other ROI's. Then, the shift vector weighting calculation unit 70 sets the normalized result of the given weight and the matching degree to the shift vector.

In such a process, for example, the template ROI in which the edge of the rib cage exists can be judged as the ROI set nearby the rib cage. Moreover, by calculating the horizontal and vertical distances between the center of the template ROI and the edge of the rib cage, it is possible to judge based on the smaller one of the calculated distances whether or not the relevant edge exists nearby the rib cage. In addition, by calculating the distance between the center of the template ROI and the nearest edge of the rib cage, it is possible to judge based on the calculated distance whether or not the relevant edge exists nearby the rib cage.

According to the above fourth embodiment, it is possible to have the effects same as those in the first to third embodiments.

Fifth Embodiment

Figure 10:
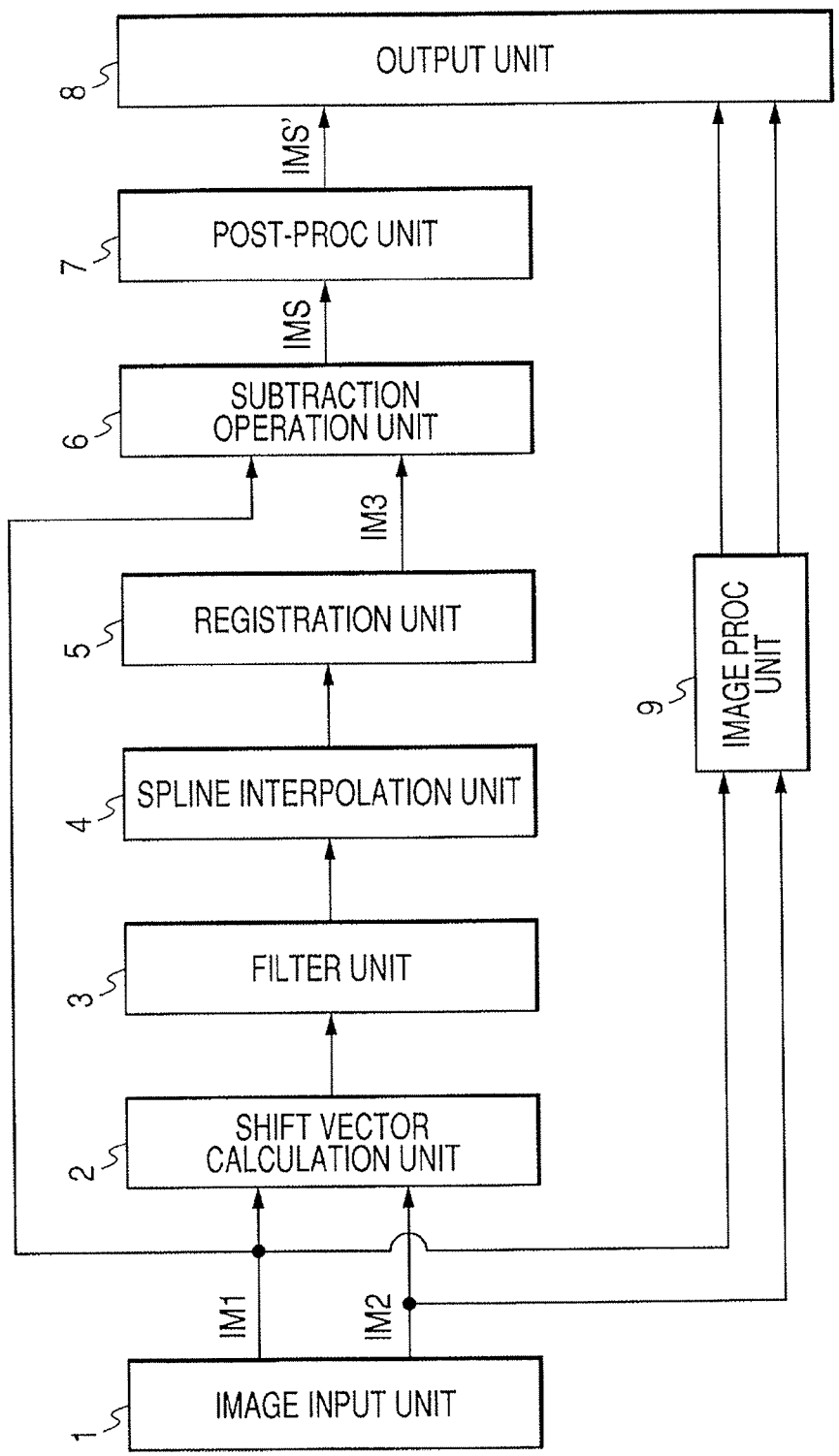
FIG. 10 is a block diagram showing the constitution of an image processing device according to the fifth embodiment of the present invention.

FIG. 10 is a block diagram showing the constitution of an image processing device according to the fifth embodiment of the present invention.

Incidentally, it should be noted that each constituent element of the image processing device may be achieved by dedicated hardware or by operating a program on a general-purpose computer. In the latter case, each constituent element shown in FIG. 10 can be achieved when a CPU executes the module of the relevant program.

Hereinafter, one example of the constitution of a computer system capable of achieving the image processing device according to the fifth embodiment will be explained.

Figure 11:
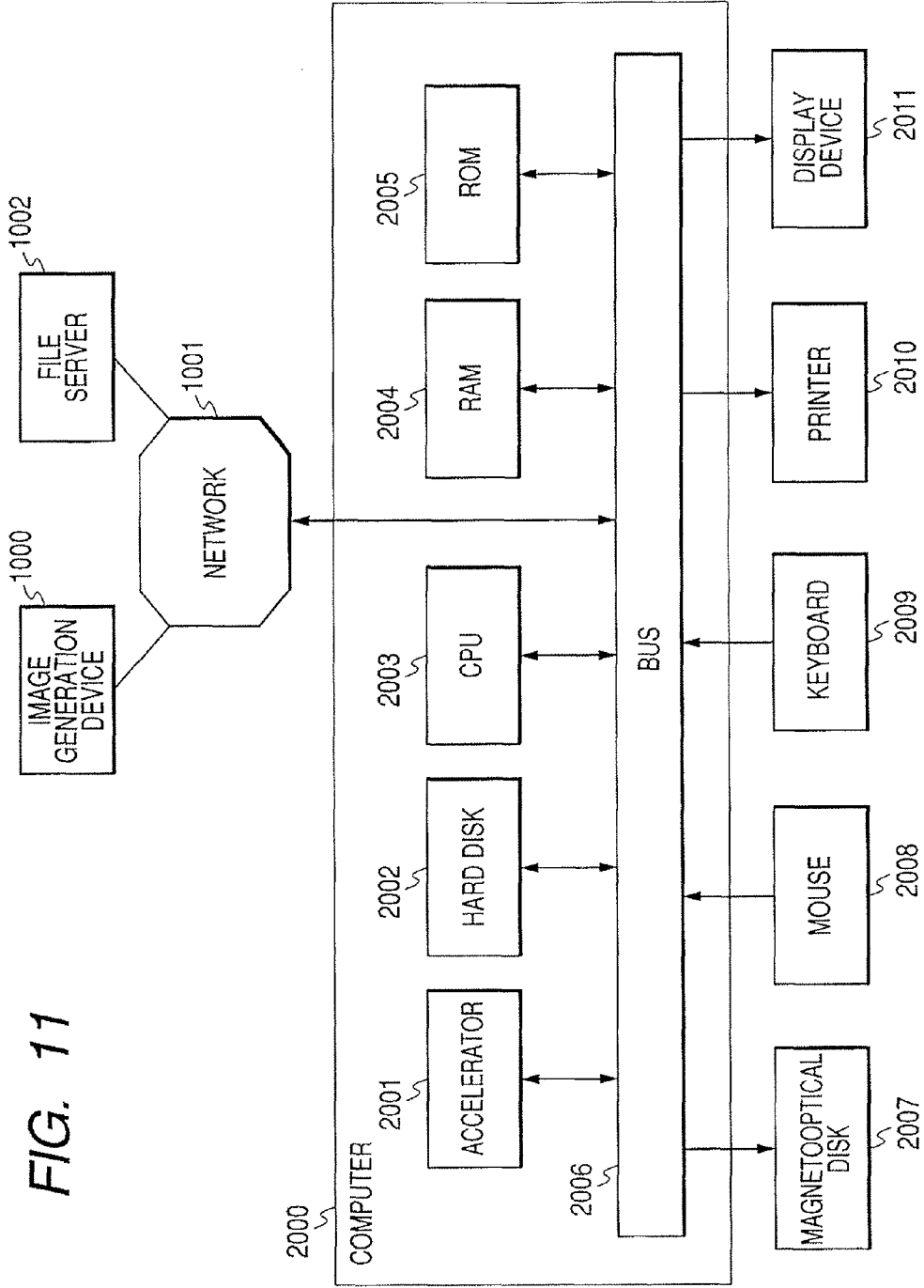
FIG. 11 is a block diagram showing an example of the constitution of a computer system capable of achieving the image processing device according to the fifth embodiment of the present invention.

FIG. 11 is a block diagram showing one example of the constitution of the computer system capable of achieving the image processing device according to the fifth embodiment of the present invention.

A computer 2000 which functions as the image processing device according to the fifth embodiment can connect with an image generation device 1000 for generating a medical X-ray image and a file server 1002 through a network 1001. However, it is of course possible to constitute the computer 2000 alone.

The computer 2000 includes an accelerator 2001, a hard disk 2002, a CPU 2003, a RAM 2004 and a ROM 2005, and is connected with various peripheral devices such as a magnetooptical disk 2007, a mouse 2008, a keyboard 2009, a printer 2010 and a display device 2011. Here, it should be noted that such constituent elements are mutually connected with others through a bus 2006.

The CPU 2003 controls each constituent element connected through the bus 2006 to achieve the image processing device in the fifth embodiment. The accelerator 2001 achieves the various image processing functions, and further achieves various processes by cooperating with the CPU 2003. The hard disk 2002 stores the control programs concerning the various processes to achieve the fifth embodiment, and the data such as image data and the like to be processed.

The RAM 2004 functions as a working area and a pull-off area for various data, and the ROM 2005 stores various data such as control programs, various parameters and the like. The magnetooptical disk 2007 which is generally called an MO stores control programs, various data such as the image data to be processed, and the like. The mouse 2008 or the keyboard 2009 functions as an input device for inputting process execution instructions and various data. Here, in addition to the mouse 2008 and the keyboard 2009, another pointing device such as a pen or the like can be used.

The printer 2010 prints various data such as image data and the like to be processed. Here, it should be noted that, as a print method for the printer 2010, it is possible to use various methods such as an inkjet print method, a laser beam print method, a thermal transfer print method, and the like. The display device 2011 displays an operation screen which is used to execute various processes, and also displays various processed results. Here, it should be noted that, as the display device 2011, it is possible to use a CRT, an LCD (liquid-crystal display) and the like.

Besides, the computer 2000 can transmit/receive the image data to/from the image generation device 1000 and the file server 1002 both exteriorly disposed, through the network 1001 connected by an interface (not shown).

In such a constitution, the program for achieving the function of the image processing device according to the present invention is stored in, for example, the hard disk 2002 or the file server 1002 connected through the network 1001. Then, the program is read and written in the RAM 2004 of the computer 2000 in response to the user's indication, by using the input device such as the mouse 2008, the keyboard 2009 or the like. Thus, the CPU 2003 sequentially reads and executes the programs, thereby enabling to achieve the function of the image processing device according to the present invention.

Hereinafter, the operation of each constituent element shown in FIG. 10 will be explained in detail with reference to a flow chart shown in FIG. 12.

Figure 12:
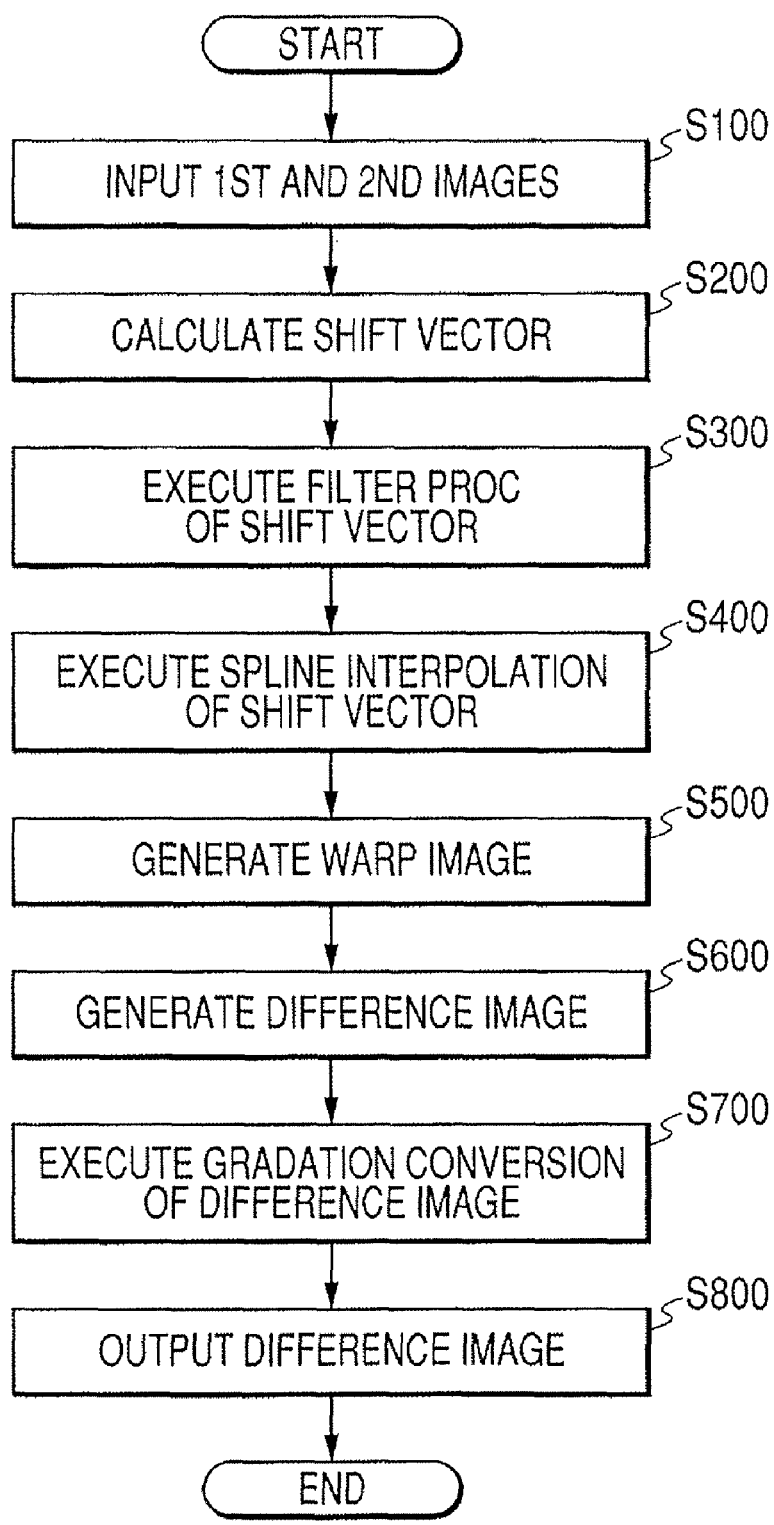
FIG. 12 is a flow chart showing the whole process to be executed by the image processing device according to the fifth embodiment of the present invention.

FIG. 12 is the flow chart showing the whole process to be executed by the image processing device according to the fifth embodiment of the present invention.

(step S100)

First, plural images (time-series images) which are the target of the subtraction process are input to an image input unit 1 in response to a predetermined input indication. Then, the image input unit 1 executes a reduction process to the input image and outputs the processed image to a shift vector calculation unit 2. Incidentally, the image input device from which the images to be input to the image input unit 1 are supplied corresponds to the storage medium such as the hard disk 2002, the magnetooptical disk 2007 or the like which is directly or indirectly connected to the computer 2000, or the image generation device 1000.

Besides, the predetermined input indication for inputting the time-series images to the image input unit 1 is issued by the operation of the user who operates the relevant image processing device, a controller (not shown) which controls the relevant image processing device, or the like.

Incidentally, for example, if the number of the pixels in the horizontal direction and the number of the pixels in the vertical directions are respectively set to have the size of $¼×¼$ as the reduction ratio in the reduction process to be applied to the input image, this size is desirable from the aspect of increasing the process efficiency as maintaining the resolution necessary in the difference image. However, the reduction ratio may not be necessarily the above value, that is, another reduction ratio can be of course used.

Moreover, it is possible to output the image to a later-described image processing unit 9, without executing the reduction process (that is, with the size unchanged). By doing so, it is possible to compare the image which is the target to be interpreted or read with the difference image in which the change is emphasized, with high resolution maintained.

Here, although the time-series images generally indicate a group of the images which are directed to an identical patient and were taken at different points in time, a pair of first and second images (IM1 and IM2) is considered as the time-series images in the present embodiment to simplify the explanation. However, even if the number of images is three or more, a pair of the images is selected as one couple from among the three or more images, and it only has to apply the later-described process to each couple.

In FIG. 10, the first image IM1 and the second image IM2 together constitute the time-series images to be input from the image input unit 1. In the present embodiment, it is assumed that the first image IM1 is the image taken lately and the second image IM2 is the image taken before the time when the first image IM1 was taken. Incidentally, in the following explanation, it is assumed that the images IM1 and IM2 are the chest X-ray front images. However, the present invention is not limited to this. That is, the present invention is of course applicable to other kinds of images without departing from the purpose of thereof.

Moreover, for example, the first image IM1 and the second image IM2 are the images which are generated through a digital radiography system to which CR (computer radiography) or the like using a flat panel detector or photostimulable phosphor is applied, and the characteristic of the image data indicated by these images is in proportion to the logarithm of a relative X-ray amount acquired when the subject is taken.

In other words, when a medical image taken by the digital radiography system is interpreted, a non-linear gradation transformation process is ordinarily executed so as to conform with the characteristic of a silver salt film which has been conventionally used. However, in the present invention, the image data which is acquired before the above gradation transformation process is executed is used.

Figure 13:
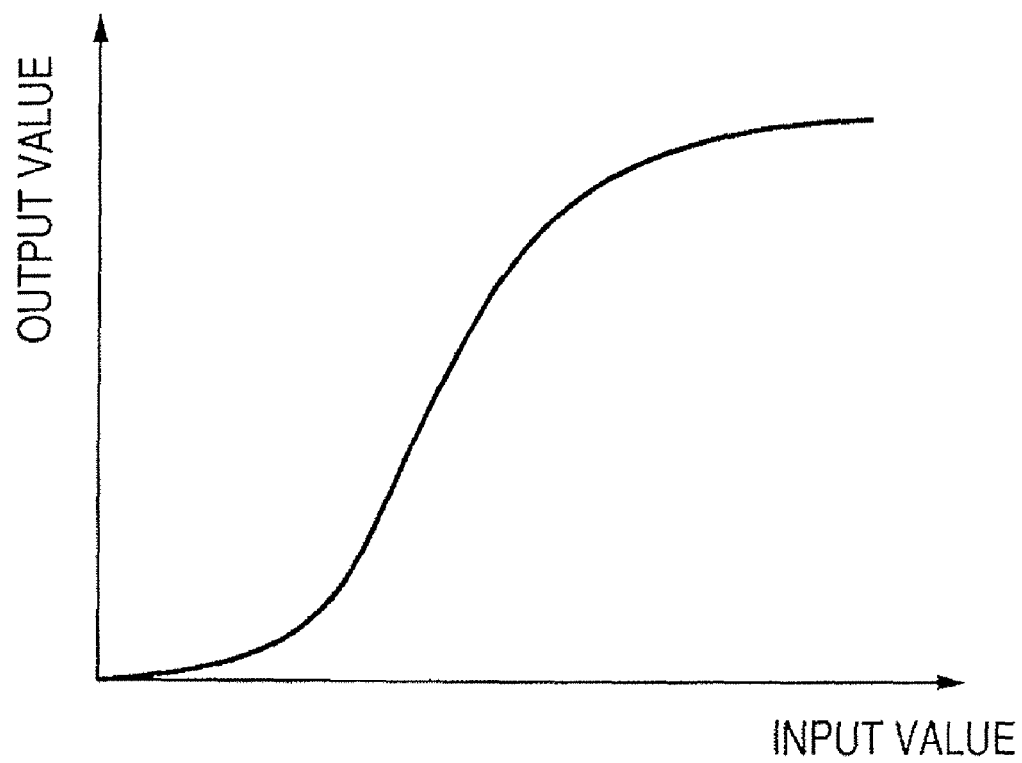
FIG. 13 is a diagram showing an example of the gradation transformation characteristic according to the fifth embodiment of the present invention.

On one hand, the first image IM1 and the second image IM2 are output to the image processing unit 9. Thus, the image processing unit 9 executes the above gradation transformation process to these images, generates the gradation-transformed images which are most suitable for interpretation, and then outputs the generated images to the output unit 8. Here, the gradation transformation process to be executed by the image processing unit 9 may be the process which has a transformation characteristic as shown in FIG. 13 which is similar to that of the conventional silver salt film. Besides, a frequency emphasis process such as an unsharp mask process or the like may additionally be executed.

In any case, the present invention is also applicable to a case where the gradation transformation process by the image processing unit 9 is previously executed, the gradation-transformed images are correlated (or associated) with the before-processed images respectively, the correlated images are stored in the predetermined storage device (e.g., the hard disk 2002), and thereafter, when the first image IM1 and the second image IM2 are designated, the stored images are read together with the designated images.

(step S200)

The shift vector calculation unit 2 calculates and outputs the shift vector indicating the physical relationship of the corresponding pixels between the input first and second images IM1 and IM2. Here, the detailed constitution of the shift vector calculation unit 2 will be explained with reference to FIG. 14, and the detailed operation of the shift vector calculation unit 2 will be explained with reference to FIG. 15.

Figure 14:
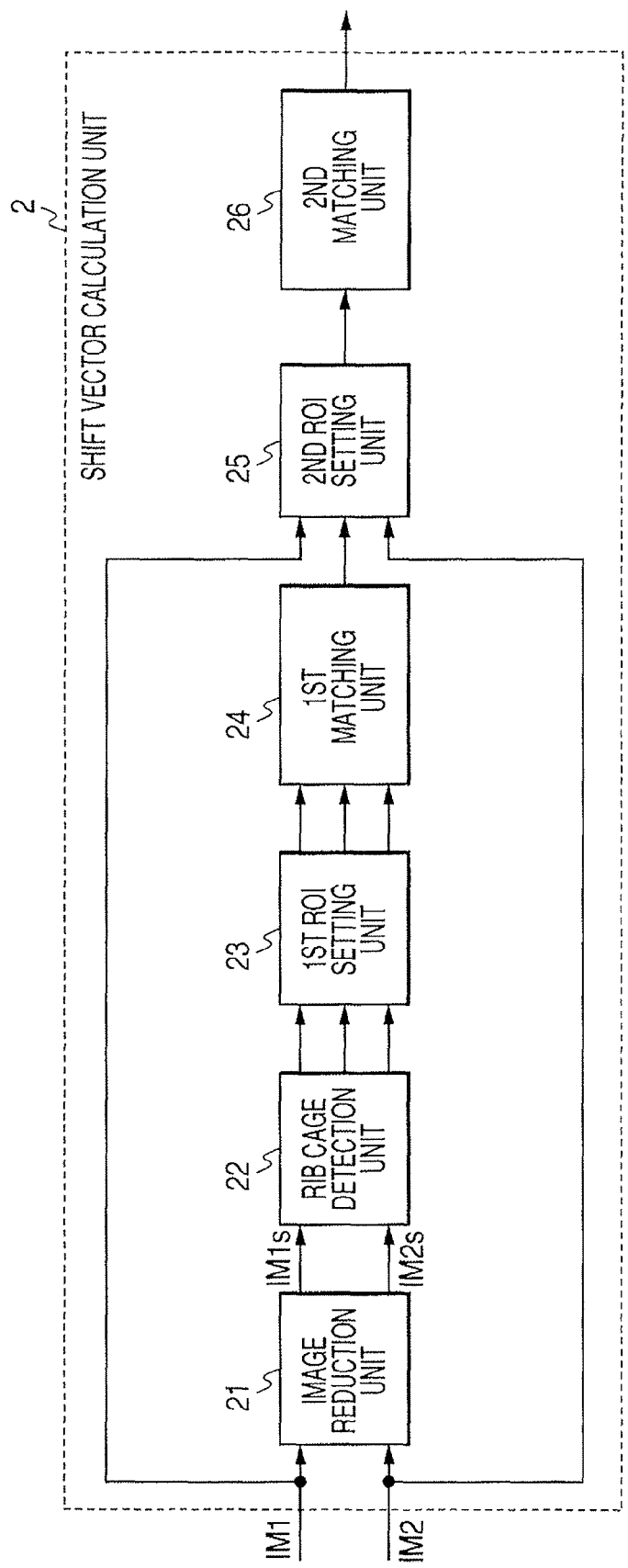
FIG. 14 is a block diagram showing the detailed constitution of the shift vector calculation unit according to the fifth embodiment of the present invention.
Figure 15:
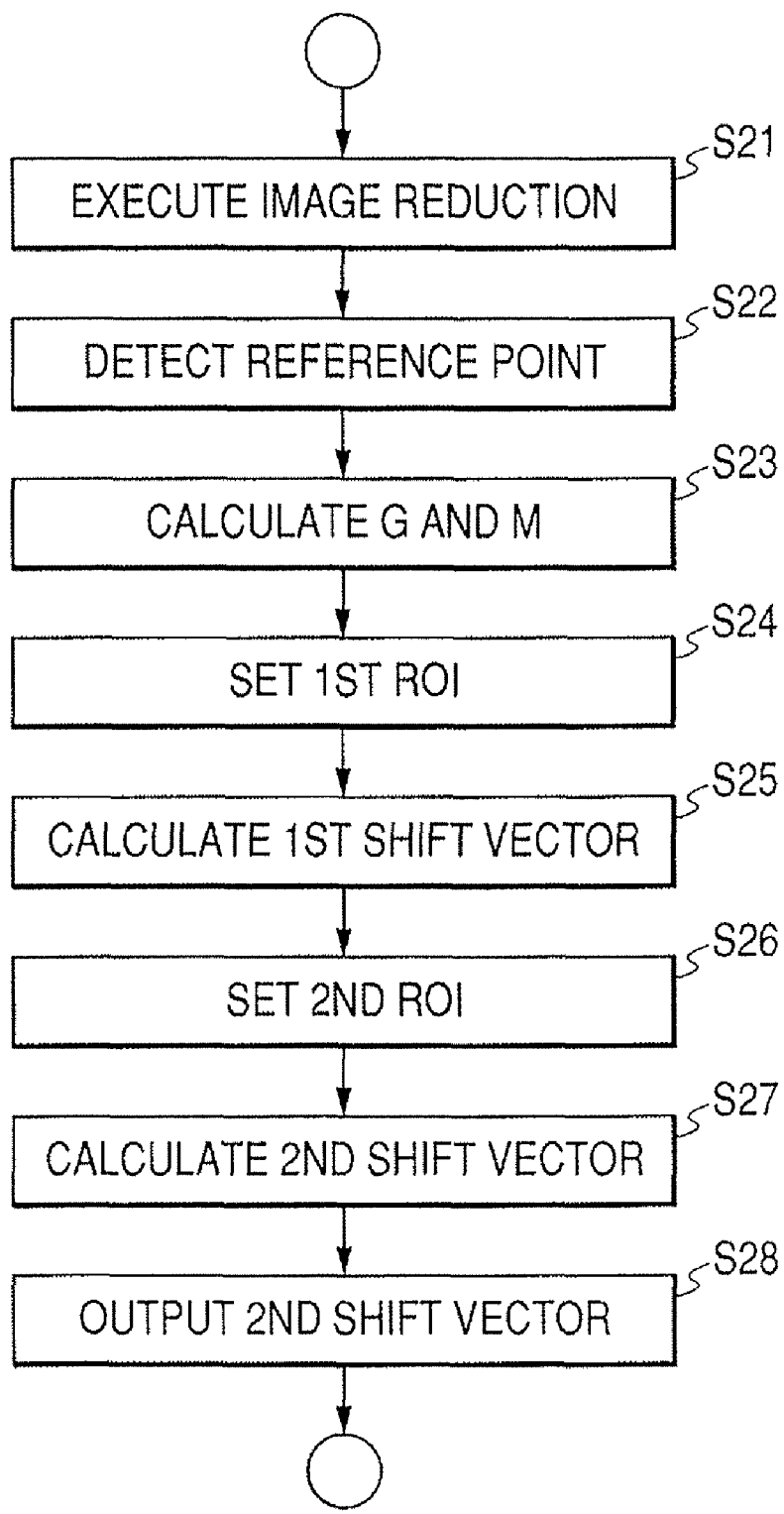
FIG. 15 is a flow chart showing the detailed operation of the shift vector calculation unit according to the fifth embodiment of the present invention.

That is, FIG. 14 is the block diagram showing the detailed constitution of the shift vector calculation unit according to the fifth embodiment of the present invention, and FIG. 15 is the flow chart showing the detailed operation of the shift vector calculation unit according to the fifth embodiment of the present invention.

(step S21)

The size of each of the first and second images IM1 and IM2 both input from the image input unit 1 is reduced to a predetermined size by an image reduction unit 21. In the present embodiment, the size in the horizontal and vertical directions of each image is reduced to ¼×¼ to generate a first reduced image IM1s and a second reduced image IM2s. Then, these reduced images are respectively input to a rib cage (thorax) detection unit 22. Meanwhile, the first and second images IM1 and IM2 of which the sizes are not reduced are respectively input to a second ROI setting unit 25.

Therefore, it should be noted that the image of which the size is 1/16×1/16 as compared with the original image size is input to the rib cage detection unit 22, and the image of which the size is ¼×¼ as compared with the original image size is input to the second ROI setting unit 25.

(step S22)

The rib cage detection unit 22 analyzes the first reduced image IM1s and the second reduced image IM2s, detects the intersection of the subject in the respective images, sets the detected intersection as the reference point, and then, based on the set reference point, outputs a rough misregistration (or displacement) amount of the subject between the two images.

Figure 16A:
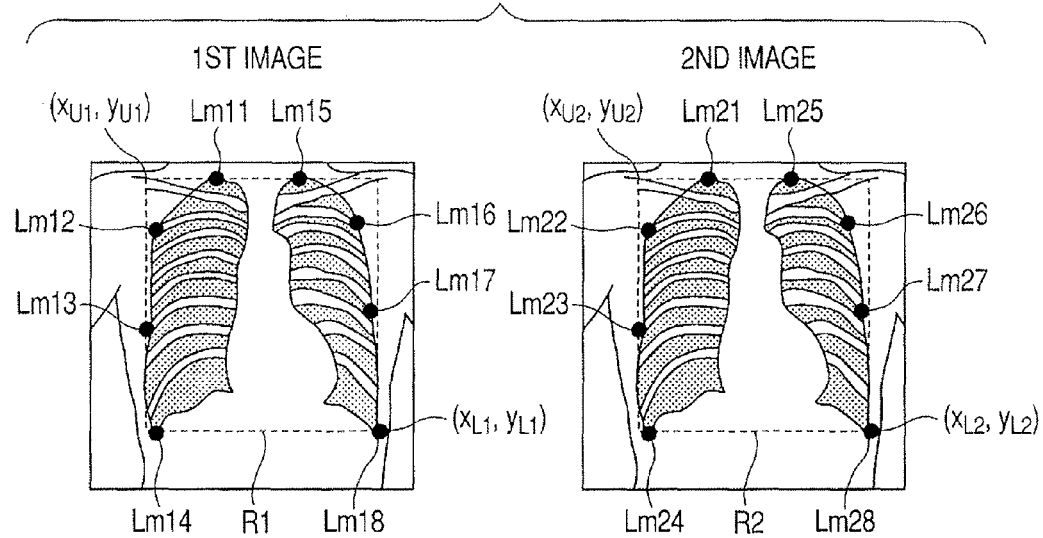
FIGS. 16A and 16B are diagrams for explaining the setting of the ROI according to the fifth embodiment of the present invention.
Figure 16B:
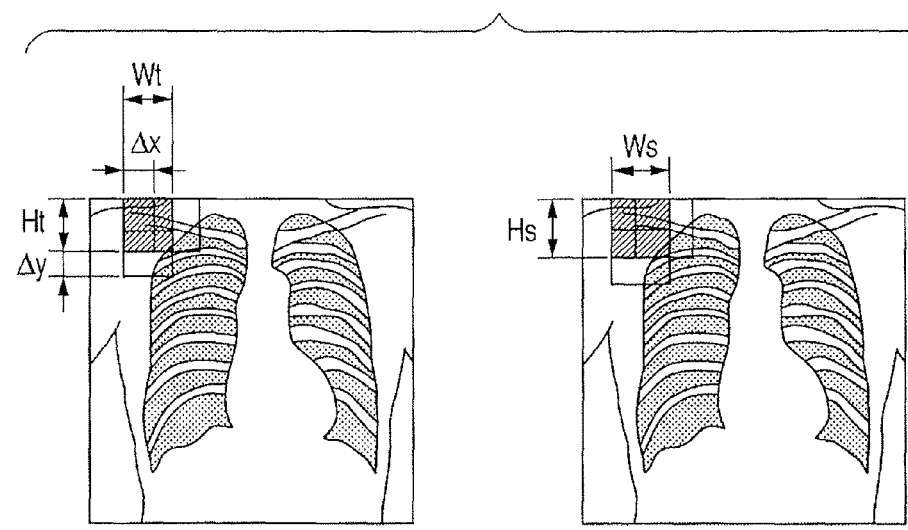

FIG. 16A shows reference points Lm11 to Lm18 which are detected in the first reduced image IM1s according to a later-described method, and FIG. 16B shows reference points Lm21 to Lm28 which are detected in the second reduced image IM2s according to the later-described method.

These reference points are determined based on the inherent characteristics included in the images of the subject. For example, in the shown the chest X-ray front images, an apex of lung (Lm11, Lm15, Lm21, Lm25), a CP (costophrenic) angle (Lm14, Lm18, Lm24, Lm28), an outer edge of rib cage (or thorax) (Lm12, Lm13, Lm16, Lm17, Lm22, Lm23, Lm26, Lm27) are detected, and rectangular regions R1 and R2 which contain these reference points are then detected.

More specifically, the CP (costophrenic) angle corresponds to the portion where the edge outside of the rib cage intersects with the shadow of the diaphragm (that is, the portion corresponding to Lm14 and Lm18 in the first image of FIG. 16A).

Figure 17A:
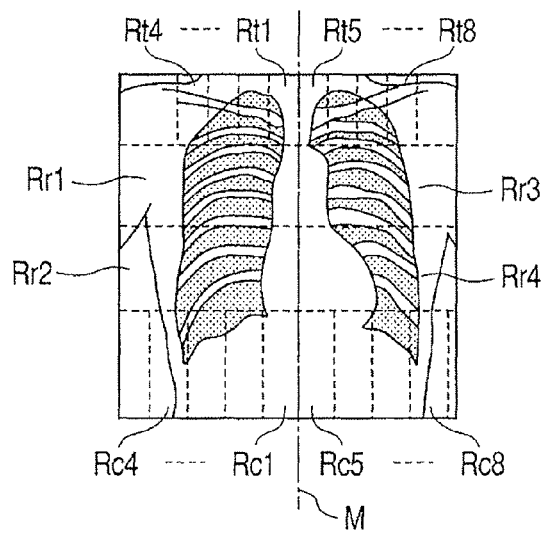
FIGS. 17A, 17B, 17C, 17D and 17E are diagrams for explaining a rib cage detection method according to the fifth embodiment of the present invention.

In the present embodiment, the rib cage detection unit 22 sets the plural rectangular regions (analysis regions) for detecting the reference points from the image to be processed, and then actually detects the plural reference points based on the image data included in the plural rectangular regions. FIG. 17A shows the status that the rectangular regions for detecting the reference points are set with respect to the chest front images. Hereinafter, how to detect the reference points will be explained.

Figure 17B:
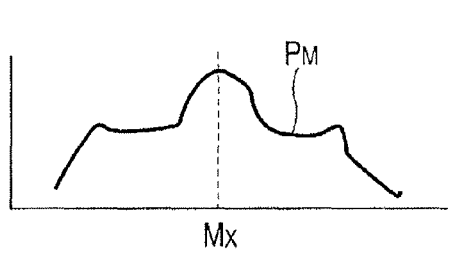

Then, the rib cage detection unit 22 generates profile data PM by accumulating in the vertical direction the image data to be processed, and then stores the generated profile data PM in the internal memory such as the RAM 2004 or the like. FIG. 17B shows an example of the profile data PM. In FIG. 17B, the horizontal coordinate Mx at which the pixel value becomes maximum is set as the horizontal coordinate of a center line M in FIG. 17A.

Subsequently, the rib cage detection unit 22 sets plural analysis regions Rt1 to Rt8 and Rr1 to Rr4, and Rc1 to Rc8 shown in FIG. 17A, respectively at the approximate symmetrical locations based on the center line M. Here, it is assumed that the size of each region is predetermined based on the average size of the subject to be taken.

Figure 17C:
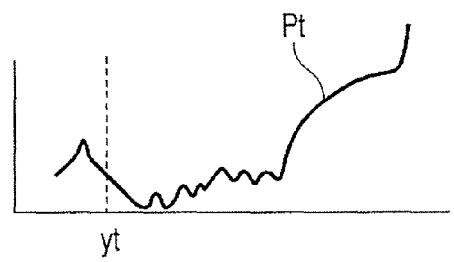

After then, the rib cage detection unit 22 generates profile data Pt by accumulating in the horizontal direction the image data to be processed, with respect to each of the analysis regions Rt1 to Rt8, and stores the generated profile data Pt in the internal memory such as the RAM 2004 or the like. FIG. 17C shows an example of the profile data Pt. In FIG. 17C, the line yt corresponds to the upper edge of the lung field in the chest front image, and the rib cage detection unit 22 detects, as the candidate location yt of the upper edge in the vertical direction, the location at which the profile data Pt first changes negatively.

Subsequently, the same process as above is executed to each region, and two-dimensional interpolation is executed with respect to each of the four regions Rt1 to Rt4 and the four regions Rt5 to Rt8 which are located at both sides of the center line M, whereby the points Lm11 and Lm15 shown in FIG. 16A are determined. Moreover, by executing the similar process to the second reduced image IM2s, the points Lm21 and Lm25 shown in FIG. 16A are determined.

Figure 17D:
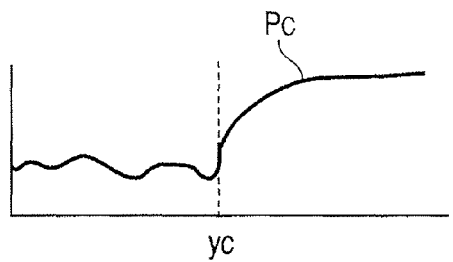

Next, the rib cage detection unit 22 analyzes the analysis regions Rc1 to Rc8, whereby the points Lm14 and Lm18 shown in FIG. 16A are determined. The image data of the respective regions are accumulated in the horizontal direction, profile data Pc is generated in the same manner as described above, and the generated profile data Pc is stored in the internal memory such as the RAM 2004 or the like. FIG. 17D shows an example of the profile data Pc. In FIG. 17D, the line yc corresponds to the border between the lung field and the diaphragm. Then, the rib cage detection unit 22 analyzes the profile data Pc, and determines the border yc at which an average brightness level maximally changes. In such determination, a primary differential value of the profile data Pc is first analyzed, and it only has to detect the location at which the analyzed value changes most greatly.

The same process is executed to each region, and the region in which the border yc has the largest value is detected. Then, the detected region is further divided into fine regions (points), and the points at which the border yc has the largest value are set as the lowest edge of the lung field (Lm14 and Lm18).

Incidentally, if the region comes off from the lung field, the profile data Pc of FIG. 17D does not change greatly. For this reason, the rib cage detection unit 22 compares a predetermined threshold with the above primary differential value. Then, if there is no differential value which exceeds the threshold, it is considered that there is no border between the lung field and the diaphragm in the relevant region, and this region is thus eliminated from the target to be processed.

By executing the similar process to the first reduced image IM1s and the second reduced image IM2s, the points Lm14, Lm18, Lm24 and Lm28 shown in FIG. 16A are detected.

Figure 17E:
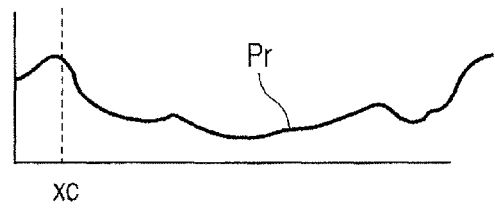

Next, the rib cage detection unit 22 generates profile data Pr by accumulating in the vertical direction the image data in the region Rr1, and stores the generated profile data Pr in the internal memory such as the RAM 2004 or the like. FIG. 17E shows an example of the profile data Pr. As shown in FIG. 17E, in the regions Rr1 and Rr2, the rib cage detection unit 22 sets the coordinate xc at which the profile data Pr has the maximum value at the most left side to a provisional horizontal coordinate value of the points Lm11 and Lm13. Meanwhile, in the regions Rr3 and Rr4, the rib cage detection unit 22 sets the coordinate xc at which the profile data Pr has the maximum value at the most right side to a provisional horizontal coordinate value of the points Lm26 and Lm27.

In case of detecting the location at which the profile data has the maximum value, if the values of the profile data enclosing the relevant location are not within a predetermined range, the relevant maximum value is eliminated as the border between the subject and the background. It is desirable to do so is desirable in terms of avoiding erroneously detecting the border of the subject.

Moreover, the rib cage detection unit 22 sets the vertical coordinate of the center point of each region as the provisional vertical coordinates of the points Lm14, Lm18, Lm24 and Lm28. Then, further smaller regions are set based on thus-acquired provisional reference points Lm14', Lm18', Lm24' and Lm28', and the same process is executed to these regions, whereby the final reference points Lm14, Lm18, Lm24 and Lm28 are determined.

Incidentally, the present invention is not limited to the above detection method. That is, another method as disclosed in, for example, Japanese Patent Application Laid-Open No. H08-335271 which corresponds to U.S. Pat. No. 5,790,690 may be applied.

Here, in the method disclosed in Japanese Patent Application Laid-Open No. H08-335271, plural one-dimensional profile data are captured from image data and analyzed to detect a rib cage (or thorax). Besides, the above method is characterized in that the whole lung field is detected in consideration of the whole shape of the lung field on the basis of the characteristic points acquired from the partial profile data.

(step S23)

The rib cage detection unit 22 determines regions R1 and R2 which are circumscribed about the reference points detected by the above method and are the targets to be subjected to the subtraction process. Here, it should be noted that, hereinafter, the regions R1 and R2 are also called the subtraction-process-target regions R1 and R2 respectively. FIG. 16A shows the regions R1 and R2 which are set respectively with respect to the first and second reduced images IM1s and IM2s. As shown in FIG. 16A, each region is determined as the maximum rectangular region which includes the reference points detected in the respective images. Then, the rib cage detection unit 22 outputs the upper left coordinates and the lower right coordinates of the region R1 respectively to the first ROI setting unit 23 and the second ROI setting unit 25.

Subsequently, the rib cage detection unit 22 calculates the center coordinates (xc1, yc1) and (xc2, yc2) of the respective regions R1 and R2, calculates a global shift (or displacement) amount G between the first reduced image IM1s and the second reduce image IM2s by the equation (10), and outputs the calculated misregistration amount G to the first ROI setting unit 23.

$$G = \begin{bmatrix} G_x \\ G_y \end{bmatrix} = \begin{bmatrix} xc2 - xc1 \\ yc2 - yc1 \end{bmatrix} \quad (10)$$

Moreover, the rib cage detection unit 22 calculates a magnification change M of the subject included in the first and second reduced images IM1s and IM2s from the upper left and lower right coordinates of the regions R1 and R2 shown in FIG. 16A, by the equation (11), and outputs the calculated magnification change M to the first ROI setting unit 23.

$$M = \begin{bmatrix} M_x \\ M_y \end{bmatrix} = \begin{bmatrix} \dfrac{x_{L2} - x_{U2}}{x_{L1} - x_{U1}} \\ \dfrac{y_{L2} - y_{U2}}{y_{L1} - y_{U1}} \end{bmatrix} \quad (11)$$

(step S24)

The first ROI setting unit 23 sets the plural ROI's with respect to the first reduced image IM1s and the second reduce image IM2s, from the coordinates of the subtraction-process-target region R1, the global shift amount G and the magnification change M which are input by the rib cage detection unit 22.

FIG. 16B shows, for simplicity, only the upper-left three ROI's from among the ROI's set with respect to the first reduced image IM1s and the second reduce image IM2s. In FIG. 16B, the rectangular ROI of which the size is Wt×Ht is set with respect to the first reduced image IM1s, and the rectangular ROI of which the size is Ws×Hs is set with respect to the second reduced image IM2s. Here, the ROI which is set with respect to the first reduced image IM1s is called the template ROI, and the ROI which is set with respect to the second reduced image IM2s is called the search ROI.

The first ROI setting unit 23 arranges the center of the first template ROI in the first reduced image IM1s so as to overlap the location corresponding to the upper left of the subtraction-process-target region R1. Subsequently, the first ROI setting unit 23 sets the template ROI at intervals of Δx horizontally and Δy vertically in the range which covers the whole of the region R1.

Next, the first ROI setting unit 23 arranges the search ROI based on the location of the template ROI set in the first reduced image IM1s, the global shift amount G and the magnification change M which are input from the rib cage detection unit 22. That is, if it is assumed that the center coordinates of the corresponding n-th template ROI are $(x_n^{t1}, y_n^{t1})$ and the center coordinates of the search ROI are $(x_n^{s1}, y_n^{s1})$, the location of the center coordinates of the n-th search ROI is calculated by the equations (12) and (13).

$$x_n^{s1} = x_n^{t1} + \text{mod}(n, C) M_x \Delta x + G_x \ (n=0, \ldots, N-1) \quad (12)$$

$$y_n^{s1} = y_n^{t1} + \text{floor}(n/C) M_y \Delta y + G_y \ (n=0, \ldots, N-1) \quad (13)$$

Here, it should be noted that the symbol N denotes the number of the template ROI's and the corresponding search ROI's, and the number N is determined based on the number by which the template ROI's can be set in the difference-process-target region R1 of the first reduced image IM1s. AND the symbol C denotes the number of ROI's for horizontal direction, the symbol mod( ) denotes the modulo arithmetic, and the symbol floor denotes the floor function.

The size of the template ROI, the size of the search ROI, the horizontal interval Δx and the vertical interval Δy are previously determined and stored in, for example, the internal memory such as the RAM 2004 or the like of the shift vector calculation unit 2. Incidentally, as these values, appropriate values are previously selected in conformity with a kind of subjected to be subjected to the subtraction process.

For example, in the case where the target is the chest front image, it is desirable to approximately set the size of the template ROI to 20×20 [mm], the size of the search ROI to 25×25 [mm], and the set interval to 3 [mm]. However, the present invention is not limited to these values, that is, other values can of course be applied to the present invention. Moreover, the shape of the ROI is not limited to the rectangle, that is, another shape can of course be applied to the ROI.

The first ROI setting unit 23 outputs the locations and the sizes of the template ROI's and the search ROI's set as above to a first matching unit 24.

(step S25)

The first matching unit 24 executes the matching process to the data of the first and second reduced images IM1s and IM2s included in the input template ROI's and the corresponding search ROI'S, calculates the location at which the degree of matching is highest as the shift vector with respect to each set of the ROI's, and then outputs the calculated results.

Incidentally, it should be noted that various known methods is usable in the matching process. For example, a sequential similarity detection algorithm, a cross-correlation method and the like which are described in "Image Analysis Handbook" published by University of Tokyo Press can be used. In the fifth embodiment, the first matching unit 24 and a second matching unit 26 calculate the shift vector by the cross-correlation method. However, since the detail of the cross-correlation method is described in the above document, the explanation thereof will be omitted here.

Figure 18:
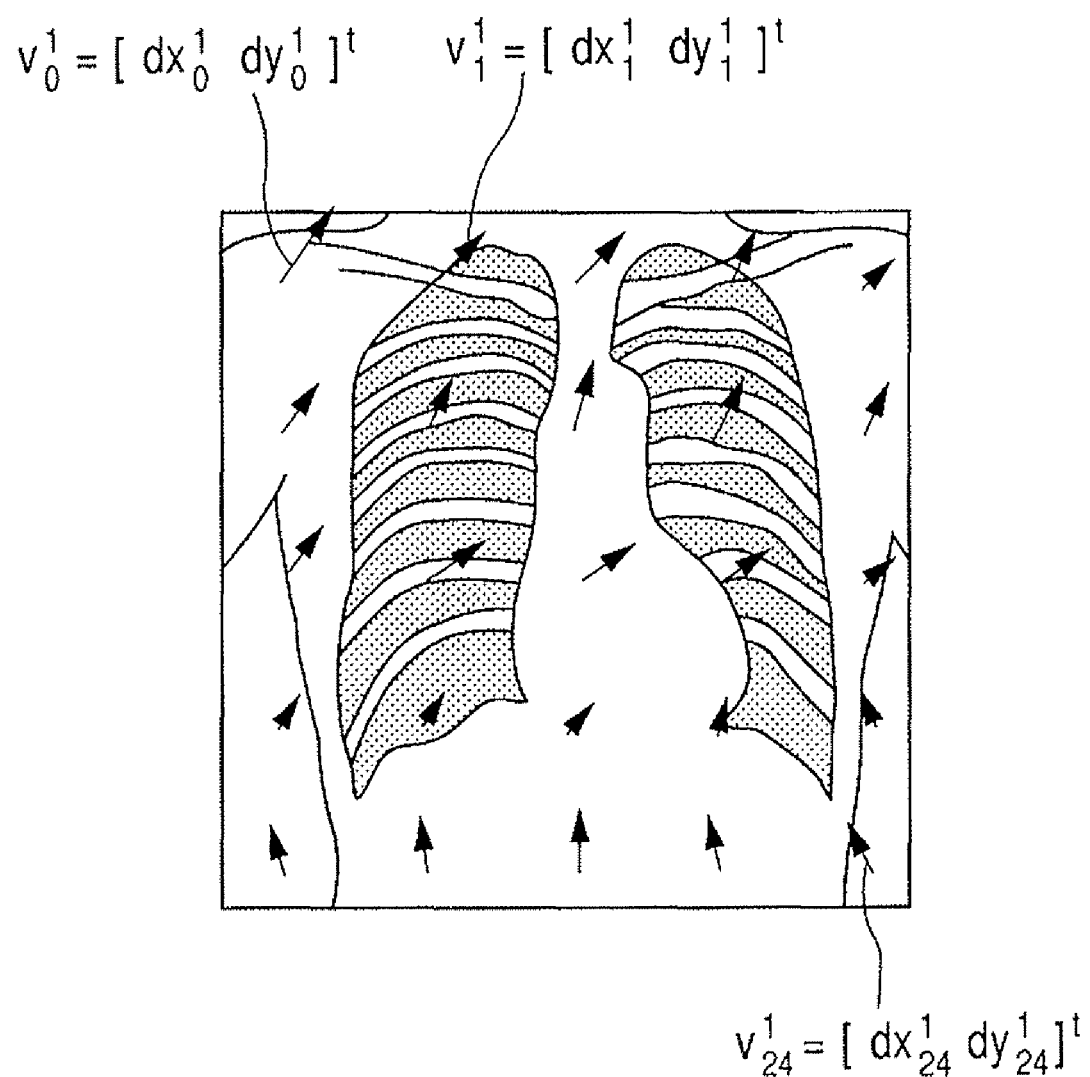
FIG. 18 is a diagram showing an example of the shift vectors according to the fifth embodiment of the present invention.

FIG. 18 shows the image which is acquired by executing the matching process with respect to each set of the template ROI and the search ROI to acquire the shift vector, and superposing the acquired shift vector on the first reduced image IM1s. Moreover, although FIG. 18 shows the 25 shift vectors by way of example, the actual number of the shift vectors depends on the size of the template ROI, the set interval and the size of the subtraction-process-target region. Each shift vector indicates that the constitution of the subject included in the first reduced image IM1s corresponds to which portion of the corresponding second reduced image IM2s, that is, each shift vector indicates the misregistration amount of the subject between these two images.

The first matching unit 24 outputs the shift vector as a first shift vector $V_n^1$ (n=0, ..., 24) to the second ROI setting unit 25.

(step S26)

The second ROI setting unit 25 sets the template ROI and the search ROI respectively to the first image IM1 and the second image IM2 based on the first shift vector $V_n^1$ input from the first matching unit 24 and the subtraction-process-target region R1 input in advance from the rib cage detection unit 22.

In the process by the first ROI setting unit 23, the template ROI and the search ROI are set based on the location and the size of the subtraction-process-target region. However, in the second ROI setting unit 25, the ROI is set based on the first shift vector $V_n^1$.

First, the second ROI setting unit 25 transforms the coordinates of the subtraction-process-target region R1 and the first shift vector $V_n^1$ input from the first matching unit 24 into the values in the first image IM1 or the second image IM2 based on the reduction magnification used in advance by the image reduction unit 21 to reduce the first image IM1 and the second image IM2.

In the fifth embodiment, the first reduced image IM1s and the second reduce image IM2s are respectively equivalent to ¼ of the first image IM1 and the second image IM2 in the vertical and horizontal directions. Thus, the first shift vector $V_n^1$ and the coordinates of the subtraction-process-target region R1 are respectively quadruplicated, whereby the transformed first shift vector $V_n^{1'}$ and the transformed coordinates R1' of the subtraction-process-target region R1 are acquired. Here, it should be noted that the transformed coordinates R1' of the subtraction-process-target region R1 are also called the subtraction-process-target region R1.

Next, the second ROI setting unit 25 sets the template ROI with respect to the first image IM1 in the same manner as that used by the first ROI setting unit 23. At that time, the subtraction-process-target region is the subtraction-process-target region R1' and the size and the set intervals of the ROI are simply quadruplicated with respect to the respective values set by the first ROI setting unit 23. However, from the viewpoint of increasing process efficiency and suppressing errors occurring due to unnecessary matching, it is desirable to set the size of the ROI to be smaller than the value set in the first template ROI.

Subsequently, the second ROI setting unit 25 arranges the search ROI with respect to the second image IM2, based on the equations (14) and (15). That is, if it is assumed that the center coordinates of the corresponding n-th template ROI are $(x_n^{t2}, y_n^{t2})$, the center coordinates of the search ROI are $(x_n^{s2}, y_n^{s2})$, and the transformed n-th first shift vector is $v_n^{1'} = (x_n^{1'}, y_n^{1'})$, the center coordinates location of the n-th search ROI is calculated by the equations (14) and (15).

$$x_n^{s2} = x_n^{t2} + x_n^{1'} \quad (n=0, \ldots, N-1) \quad (14)$$

$$y_n^{s2} = y_n^{t2} + y_n^{1'} \quad (n=0, \ldots, N-1) \quad (15)$$

The second ROI setting unit 25 outputs the location and the size of the template ROI and the search ROI set as above to the second matching unit 26.

(step S27)

The second matching unit 26 executes the matching process to the data of the first and second images IM1 and IM2 included in the input template ROI's and the corresponding search ROI's, calculates the location at which the degree of matching is highest as a shift vector $V_n^2$ with respect to each set of the ROI's, and then outputs the calculated results to a filter unit 3 (FIG. 10). Here, the matching process by the second matching unit 26 is the same as that by the first matching unit 24, whereby the explanation thereof will be omitted.

Incidentally, in the fifth embodiment, each of the first matching unit 24 and the second matching unit 26 calculates the shift vector by the cross-correlation method. However, either one of the first and second matching units 24 and 26 may use another method. For example, if the first matching unit 24 uses the sequential similarity detection algorithm and the second matching unit 26 uses the cross-correlation method, it is possible to shorten a whole processing time as maintaining accuracy in the matching to some extent.

Subsequently, the detailed operation by the filter unit 3 will be explained with reference to the flow charts shown in FIGS. 12 and 19.

(step S300)

The filter unit 3 executes a filter process to the input second shift vector $V_n^2$ to eliminate error components mixed in the matching, and outputs a third shift vector $V_n^3$ from which the error components have been eliminated. Hereinafter, the detailed operation of the filter unit 3 will be explained with reference to the flow chart shown in FIG. 19.

Figure 19:
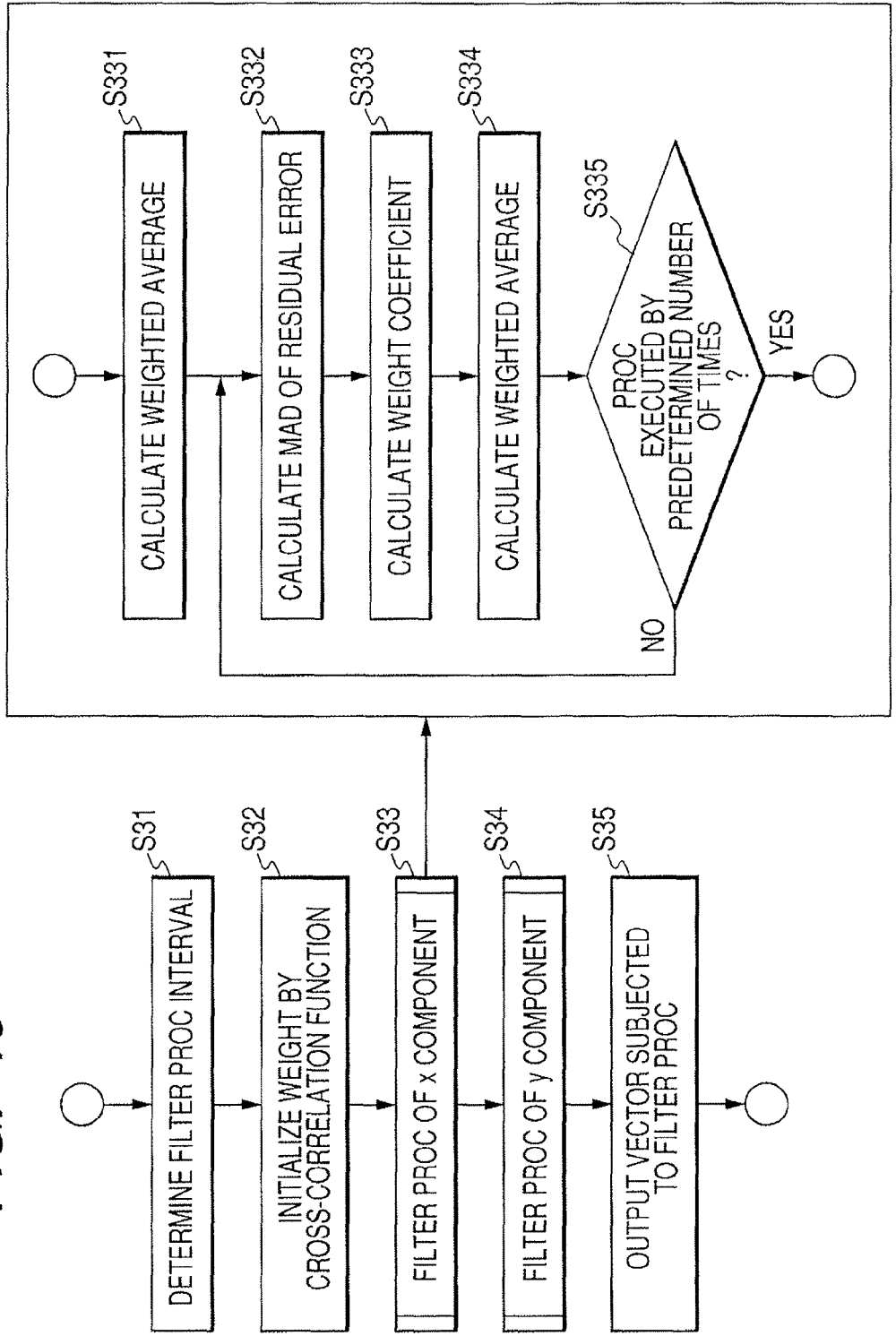
FIG. 19 is a flow chart showing the detailed operation of the filter unit according to the fifth embodiment of the present invention.

FIG. 19 is the flow chart showing the detailed operation of the filter unit according to the fifth embodiment of the present invention.

(step S31)

The filter unit 3 determines a filter process interval for the filter process with respect to the input shift vector. In the present embodiment, the process interval is equivalent to the whole image, that is, the process interval is equivalent to the interval which includes all the 25 shift vectors as shown in FIG. 18.

(step S32)

The filter unit 3 initializes a weight coefficient for each of the shift vectors, to be used in the later-described process. In the present embodiment, a cross-correlation coefficient $CC_n$ calculated in each ROI by the second matching unit 26 is used as the initial value.

(step S33)

The filter unit 3 executes the filter process to a horizontal component $x_n^2$ of the input second shift vector $V_n^2 = (x_n^2, y_n^2)$. Incidentally, the detail of the filter process will be explained in following step S331 to S335.

(step S331)

Figure 20:
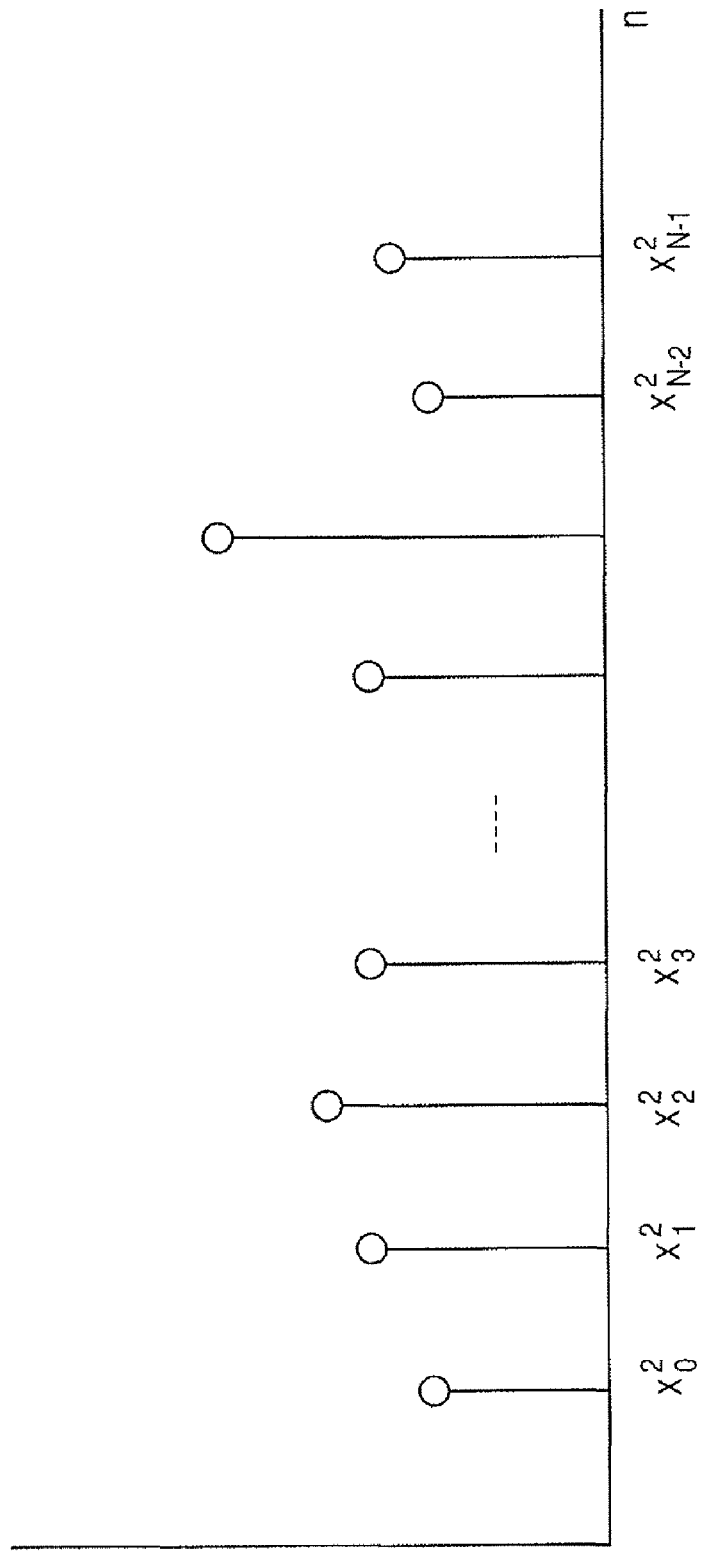
FIG. 20 is a diagram showing an example of the shift vector components according to the fifth embodiment of the present invention.

The filter unit 3 temporarily stores only the horizontal component $x_n^2$ in the internal memory such as the RAM 2004. FIG. 20 shows the horizontal component $x_n^2$ of the shift vector at that time. Then, the filter unit 3 executes a weighted average process (or weighted mean process) to the shift vector component by using the previously input cross-correlation coefficient $CC_n$ as weight, and temporarily stores a processed result $x_n^{2'}$ in the internal memory such as the RAM 2004.

(step S332)

The filter unit 3 calculates a residual error $r_n$ between the shift vector component before the weighted average process and the shift vector component after the weighted average process, by the equation (16).

$$r_n = x_n^2 - x_n^{2'} \quad (16)$$

Moreover, a median absolute deviation MAD of the residual error is calculated by the equation (17). Here, it should be noted in the equation (17) that the symbol "median (x)" is the median of "x".

$$MAD = \text{median}(|R_n|)$$

(step S333)

The filter unit 3 calculates a weight coefficient $w_n$ of the weighted average process based on the equation (18).

$$w_n = \begin{cases} CC_n \left( 1 - \left( \frac{r_n}{kMAD} \right)^2 \right)^2 & |r_n| < kMAD \\ 0 & |r_n| \geq kMAD \end{cases} \quad (18)$$

Here, the symbol k indicates the value which is previously determined based on the distribution of the residual errors. In the present embodiment, for example, k=6. However, the present invention is not limited to this, and another value may be used.

(step S334)

The filter unit 3 again executes the weighted average process to the horizontal component $x_n^2$ of the shift vector by using the weight coefficient $w_n$ updated in the previous step.

(step S335)

The filter unit 3 judges whether or not the process in the step S332 and the following steps is executed by the number of times equivalent to a predetermined number of times T. If it is judged that the relevant process is executed by the predetermined number of times T (that is, YES in the step S335), the flow advances to the next step. Meanwhile, if it is judged that the relevant process is not executed by the predetermined number of times T (that is, NO in the step S335), the flow returns to the step S332. Here, the predetermined number of times T may be determined based on the balance of the process efficiency and the effect of the filter process. However, it is desirable to set T=2 or so.

(step S34)

The filter unit 3 executes the same process as above to the vertical component $y_n^2$ of the shift vector. Here, since the content of the process in the step S34 is substantially the same as that in the step S33 concerning the horizontal component $x_n^2$, the explanation thereof will be omitted.

(step S35)

The filter unit 3 outputs the third shift vector $V_n^3 = (x_n^3, y_n^3)$ which has been subjected to the filter process with respect to each of the horizontal and vertical directions by the above method, to a spline interpolation unit 4.

Then, FIG. 12 will be again explained.

(step S400)

The spline interpolation unit 4 executes an interpolation process to the third shift vector $V_n^3 = (x_n^3, y_n^3)$ by using known cubic spline interpolation, and outputs a fourth shift vector $V_n^4 = (X_n^4, Y_n^4)$ acquired in the interpolation process to a registration unit 5. In this process, the spline interpolation unit 4 applies the cubic spline interpolation to each of the horizontal and vertical components of the lines of the third shift vector $V_n^3$.

Incidentally, the cubic spline interpolation may be executed by a method described in, for example, "Digital Image Warping", G. Wolberg, IEEE Computer Society Press, 1990 or the like, and this method is well known, whereby the detailed explanation thereof will be omitted.

Figure 21:
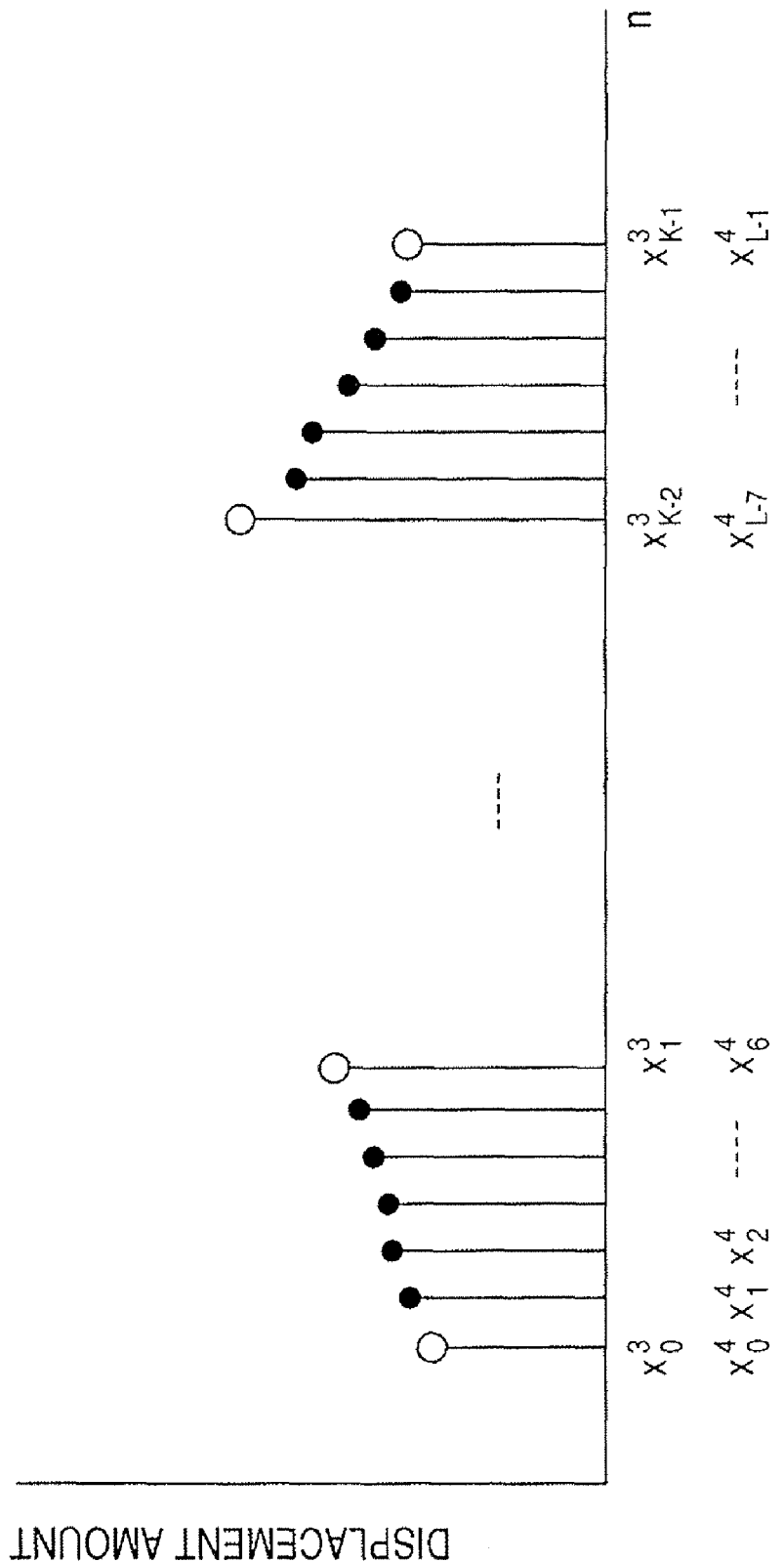
FIG. 21 is a diagram showing an example of the interpolated shift vectors according to the fifth embodiment of the present invention.

FIG. 21 shows the status that the horizontal component of a certain line of the third shift vector $V_n^3$. In FIG. 21, the symbol K indicates the number of shift vectors in the horizontal direction before the interpolation is executed, and the symbol L indicates the number of shift vectors after the interpolation was executed. Incidentally, as the number L, a value by which sufficient image quality can be achieved in the later-described difference image generation may previously be determined. For example, it is sufficient if the number L is the centuplicate of the number K.

(step S500)

The registration unit 5 deforms the second image IM2 by using the fourth shift vector $V_n^4$ input from the spline interpolation unit 4, generates a warp image IM3 which has been registered with the first image IM1, and then outputs the generated warp image IM3 to a subtraction operation unit 6.

That is, the fourth shift vector $V_n^4$ indicates an accurate misregistration (displacement) amount between the common constitution respectively shown on the first image IM1 and the second image IM2. For this reason, by inversely applying the fourth shift vector $V_n^4$ to the location of each pixel of the warped second image IM3, the corresponding location on the first image is calculated, and the pixel value may be determined by executing sampling according to the interpolation process.

In any case, since the detail of such a method is described in the above document, the detailed explanation thereof will be omitted. Incidentally, as an interpolation method in case of executing re-sampling, for example, it is desirable to use a bi-linear interpolation method or the like in consideration of image quality of the difference image.

(step S600)

The subtraction operation unit 6 executes subtraction between the pixel of the input first image IM1 and the pixel of the deformed second image IM3 to generate a difference image IMS, and outputs the generated difference image IMS to a post-processing unit 7.

(step S700)

The post-processing unit 7 executes a gradation transformation process to the input difference image IMS to generate a difference image IMS' of which the pixel value has been transformed to be within the pixel range suitable for display, and outputs the generated difference image IMS' to the output unit 8. Here, the gradation transformation may be determined according to accuracy of the image before the subtraction process and the image after the subtraction process.

For example, if accuracy of the pixel value of the image before the subtraction process is executed is unsigned 12 bits, the difference image having the range of signed 13 bits is generated by the subtraction process. Here, if the range of the pixel value that the output unit 8 can display is unsigned eight bits, it only has to linearly transform the range of 13 bits into the range of eight bits. Thus, the image which has a linear gradation characteristic to an X-ray irradiation amount with respect to the subject corresponding to the X-ray image is output from the output unit 8.

Alternatively, the histogram of the difference image is calculated, and a predetermined range based on the pixel value corresponding to the mode value in the histogram may be linearly transformed into the range of eight bits. Incidentally, it should be noted that such a transformation function between the input and output ranges need not necessarily be always linear. For example, the function of which the characteristic is as shown in FIG. 13 may be used.

(step S800)

The output unit 8 displays the input gradation-transformed difference image IMS' together with the images subjected to the interpretation-suitable gradation transformation for the original first and second images IM1 and IM2, in the form suitable for interpretation. For example, the first and second images IM1 and IM2 and the difference image IMS' are contradistinctively displayed.

The output unit 8 is, for example, a display device such as a CRT monitor, an LCD or the like. However, the display device is not limited to such an electronic display device, that is, the output unit 8 may be an image output device such as a laser imager or the like for outputting an image as a hard copy.

Moreover, in the present invention, the output unit 8 may not be necessarily the display device, that is, a hard disk attached to a computer, a network input/output device, or the like may be applied to the output unit 8.

As explained above, according to the fifth embodiment, in the filter unit 3, the shift vector which indicates the location relationship of the corresponding pixels between the input first and second images IM1 and IM2 is subjected to the filter process by using the weight coefficient determined based on the median which is difficult to be influenced by an outlier (that is, based on the median absolute deviation of the difference between the states before and after the weighted average process for the shift vector is executed), and the acquired shift vector is interpolated by the spline interpolation, thereby executing the registration.

Thus, in the latter-stage spline interpolation, it is possible to suppress the influence of an error due to the matching, whereby it is possible to achieve the high-accuracy registration which is difficult to be influenced by a partial outlier.

According to the present embodiment, it is possible to secure accuracy in the registration as also achieving efficiency in the process, whereby it is possible to generated a high-quality difference image.

Sixth Embodiment

In the fifth embodiment, the second image IM2 is deformed only once. However, the present invention is not limited to this. That is, as will explained in the sixth embodiment, it is possible to deform the second image IM2 plural times and to change the process content of the filter process for the shift vector according to the number of such times.

Figure 22:
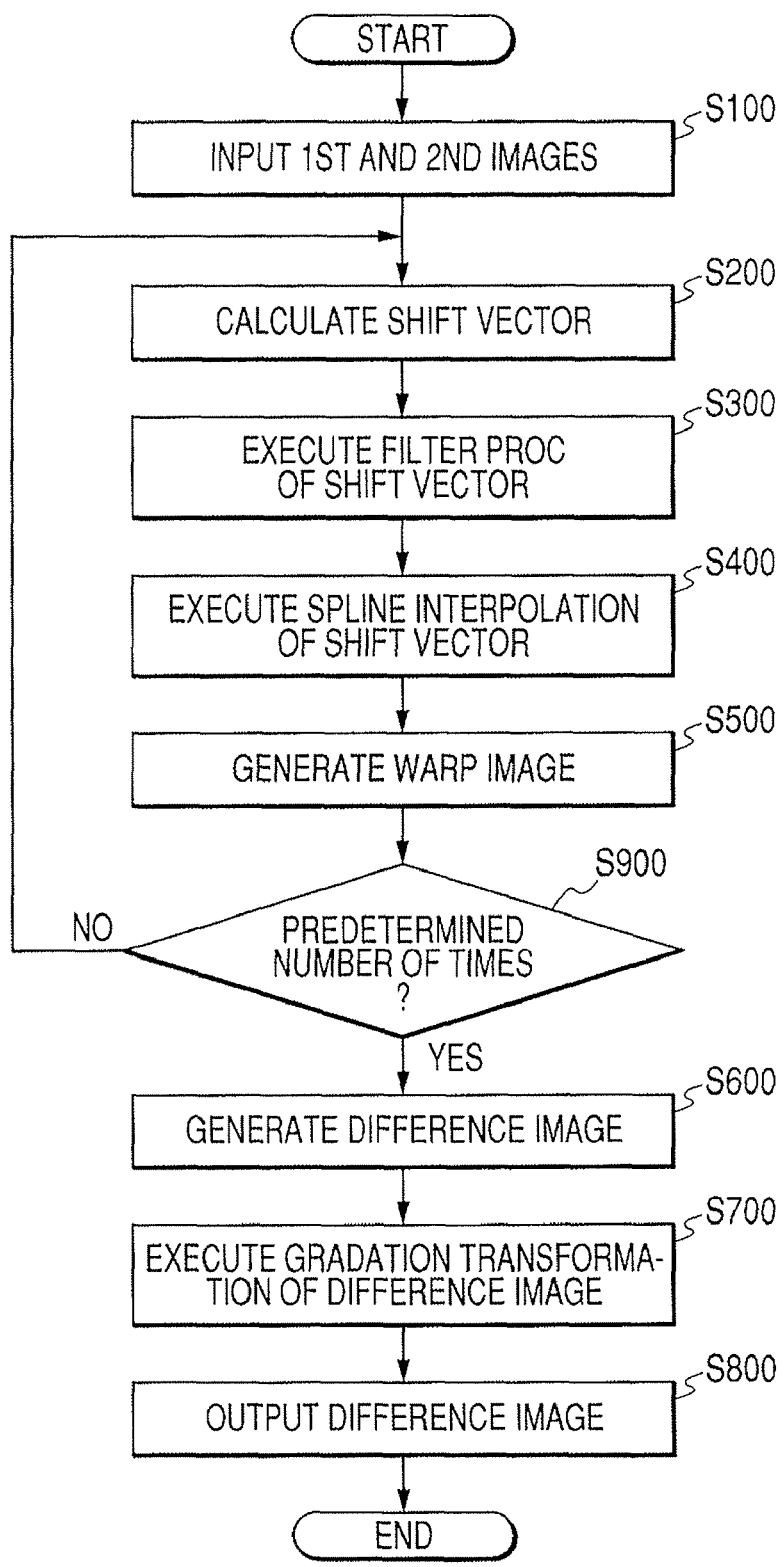
FIG. 22 is a flow chart showing the whole process to be executed by an image processing device according to the sixth embodiment of the present invention.

FIG. 22 is a flow chart showing the whole process to be executed by an image processing device according to the sixth embodiment of the present invention.

Incidentally, in the sixth embodiment, the constitution of the whole image processing device is the same as that shown in FIG. 10, and a control unit (not shown) controls the whole process.

As compared with the flow chart of FIG. 12 in the fifth embodiment, a step S900 is added in the flow chart of FIG. 22 in the sixth embodiment. Thus, the control unit (not shown) judges whether or not the warp process in the step S500 is executed a predetermined number of times. If it is judged that the warp process is not executed the predetermined number of times (that is, NO in the step S900), the flow returns to the step S200. Meanwhile, if it is judged that the warp process is executed the predetermined number of times (that is, YES in the step S900), the flow advances to the step S600.

Moreover, in the sixth embodiment, in the second and following execution of the warp process, the process in the steps S21 to S25 in FIG. 15 concerning the detailed operation of the step S200 is omitted. Then, in the second ROI setting in the step S26, the ROI is set by the equations (19) and (20), by using the third shift vector $V_n^3 = (X_n^3 Y_n^3)$ $$x_n^{s2} x_n^{t2} + x_n^3 \ (n=0, \ldots, N-1) \tag{19}$$

$$y_n^{s2} y_n^{t2} + y_n^3 \ (n=0, \ldots, N-1) \tag{20}$$

In that case, as previously explained, it is needless to say that the size of the shift vector is not changed according to the reduction size of the image.

Moreover, in the sixth embodiment, in the filter process of the step S300, the filter unit 3 calculates a weight coefficient $w_n$ of the filter process based on the equation (21).

$$W_n = \begin{cases} CC_n \left(1 - \left(\frac{r_n}{K_i MAD}\right)^2\right)^2 & |r_n| < K_i MAD \\ 0 & |r_n| \geq K_i MAD \end{cases} \tag{21}$$

Here, the symbol i indicates the number of times of warp in the relevant process. That is, the coefficient k with respect to the median absolute deviation MAD is changed according to the number of times of the repeated process. At that time, it is desirable to make the coefficient k small according to the increase of the number of times of the repeated process.

For example, in the first repeated process, as well as the fifth embodiment, the coefficient k is set to 6, and, in the second and following repeated processes, the coefficient is set to be smaller, such as 4 or 2. Thus, a tolerance for an outlier in case of calculating the weight coefficient becomes further smaller.

Typically, according as the warp is repeated, the misregistration (displacement) amount between the two images to be subjected to the registration becomes small. Thus, based upon this, if the tolerance for the outlier in the filter process is set to be small, it is possible to achieve a more effective filter process.

As explained above, according to the sixth embodiment, in addition to the effect of the above fifth embodiment, it is possible to achieve the more effective filter process as compared with that in the fifth embodiment.

Seventh Embodiment

In the above fifth and sixth embodiments, the filter unit 3 calculates the weight coefficient with respect to the shift vectors extending across the whole image, by the equation (18). However, it is possible to execute the filter process by calculating the weight coefficient with respect to each part of the image.

In the seventh embodiment, the image input unit 1 determines plural partial regions by analyzing the first image IM1 and the second image IM2, and then outputs location information of the determined partial regions to the filter unit 3.

Figure 23:
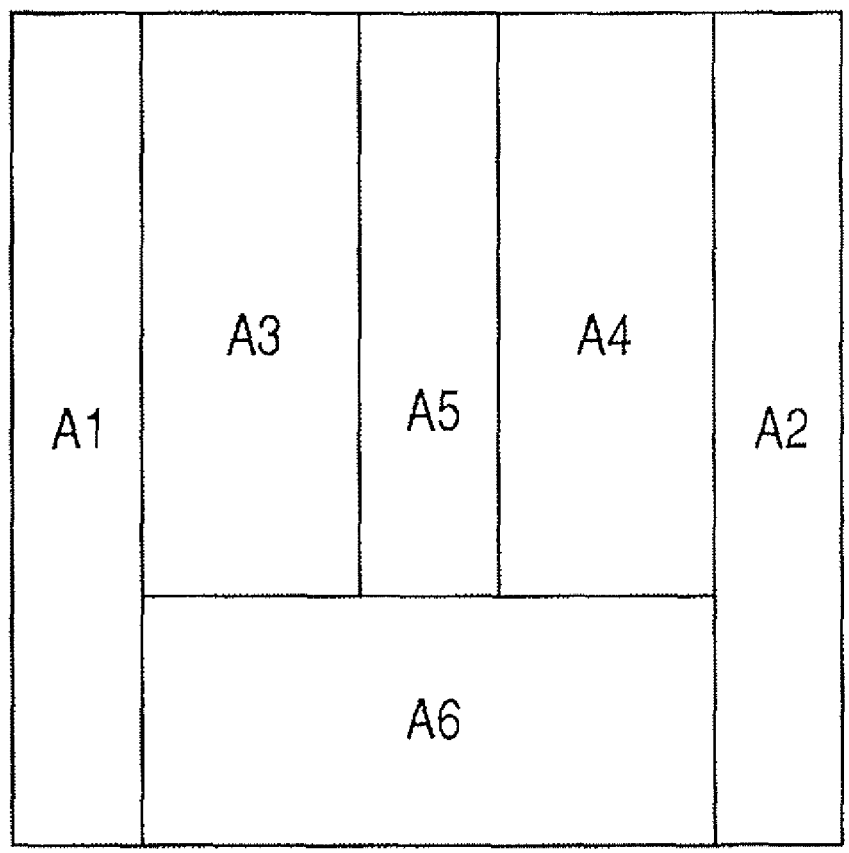
FIG. 23 is a diagram for explaining an example of the region division according to the sixth embodiment of the present invention.

FIG. 23 is a diagram for explaining an example of the region division according to the seventh embodiment of the present invention. In FIG. 23, symbols A1 to A6 respectively denote the rectangular regions substantially corresponding to the following regions, according to the constitution of a subject. That is, the regions A1 and A2 correspond to the non-subject portion, the regions A3 and A4 correspond to the lung field portion, the region A5 corresponds to the mediastinum portion, and the region A6 corresponds to the abdomen portion.

The filter unit 3 calculates the weight coefficient by changing the value of the coefficient k of the equation (18) according to each region except for the regions A1 and A2. For example, the coefficient k=6 is set to the lung field portion of the regions A3 and A4, and the coefficient k=4 is set respectively to the mediastinum portion of the region A5 and the abdomen portion of the region A6.

In the mediastinum portion of the region A5 and the abdomen portion of the region A6, the contrast of the original image is typically low. For this reason, even if the correlation coefficient itself is high, the shift vector might vary. Therefore, in the filter unit 3, by making the tolerance for the outlier small with respect to these regions, it is possible to strongly suppress noise components in the shift vector.

Incidentally, the filter process may not be divided based on the above regions inherent in the subject, but may be independently executed with respect to one of the vertical and horizontal lines of the shift vector.

As explained above, according to the seventh embodiment, in addition to the effect of the above fifth embodiment, it is possible, by causing the filter unit 3 to execute the filter process with respect to each of the characteristic partial regions in the image to be processed, to achieve the more suitable and effective filter process.

Eighth Embodiment

In the above fifth and sixth embodiments, one cubic spline interpolation is executed with respect to the shift vectors extending across the whole image. However, it is possible to execute the spline interpolation with respect to each of the plural divided regions.

Here, the region may be divided based on the anatomy as shown in FIG. 23. Besides, as shown in FIG. 24, it is possible to execute the cubic spline interpolation by using the shift vector components with respect to every four points, and output a part of the processed regions.

Figure 24:
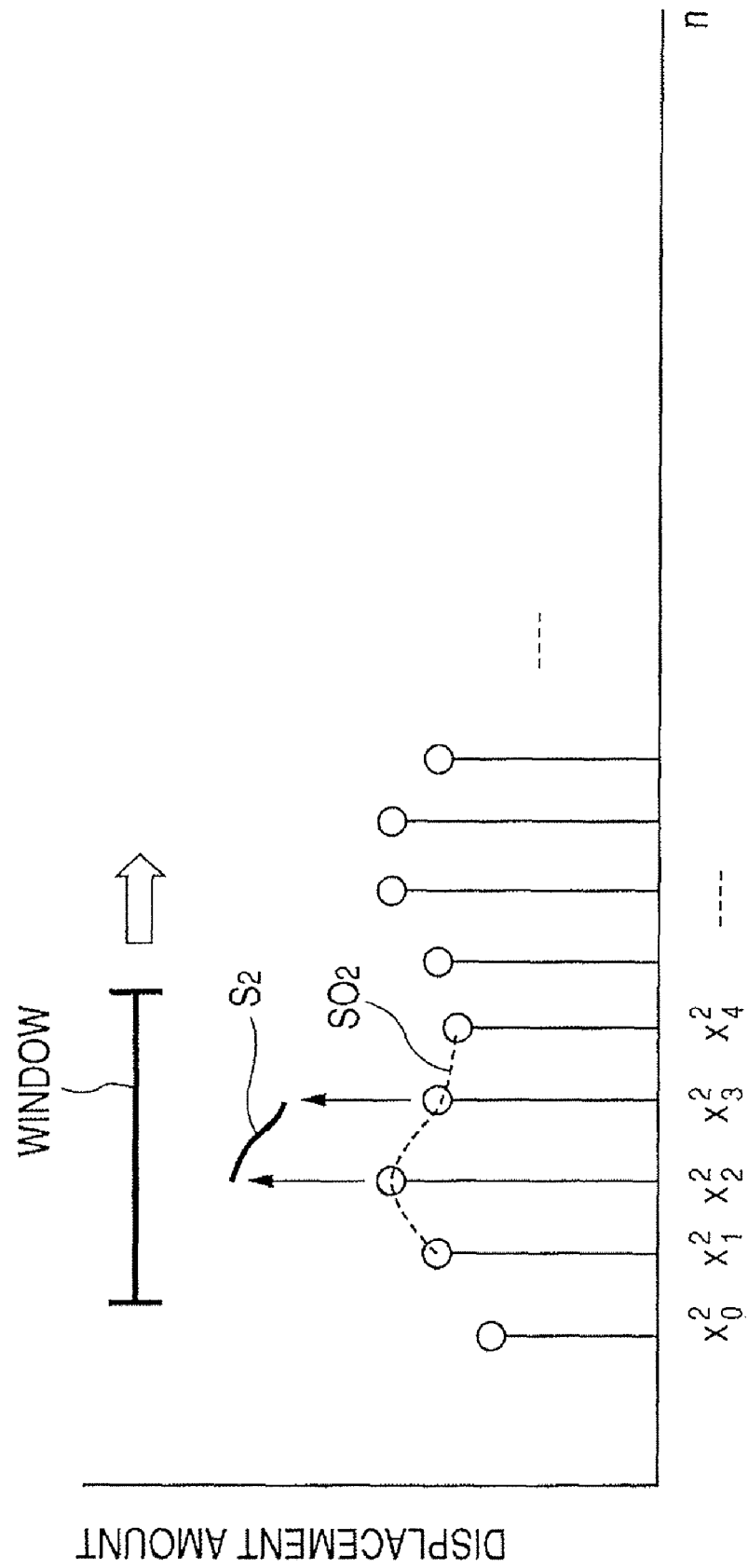
FIG. 24 is a diagram for explaining the spline interpolation according to the eighth embodiment of the present invention.
Figure 25:
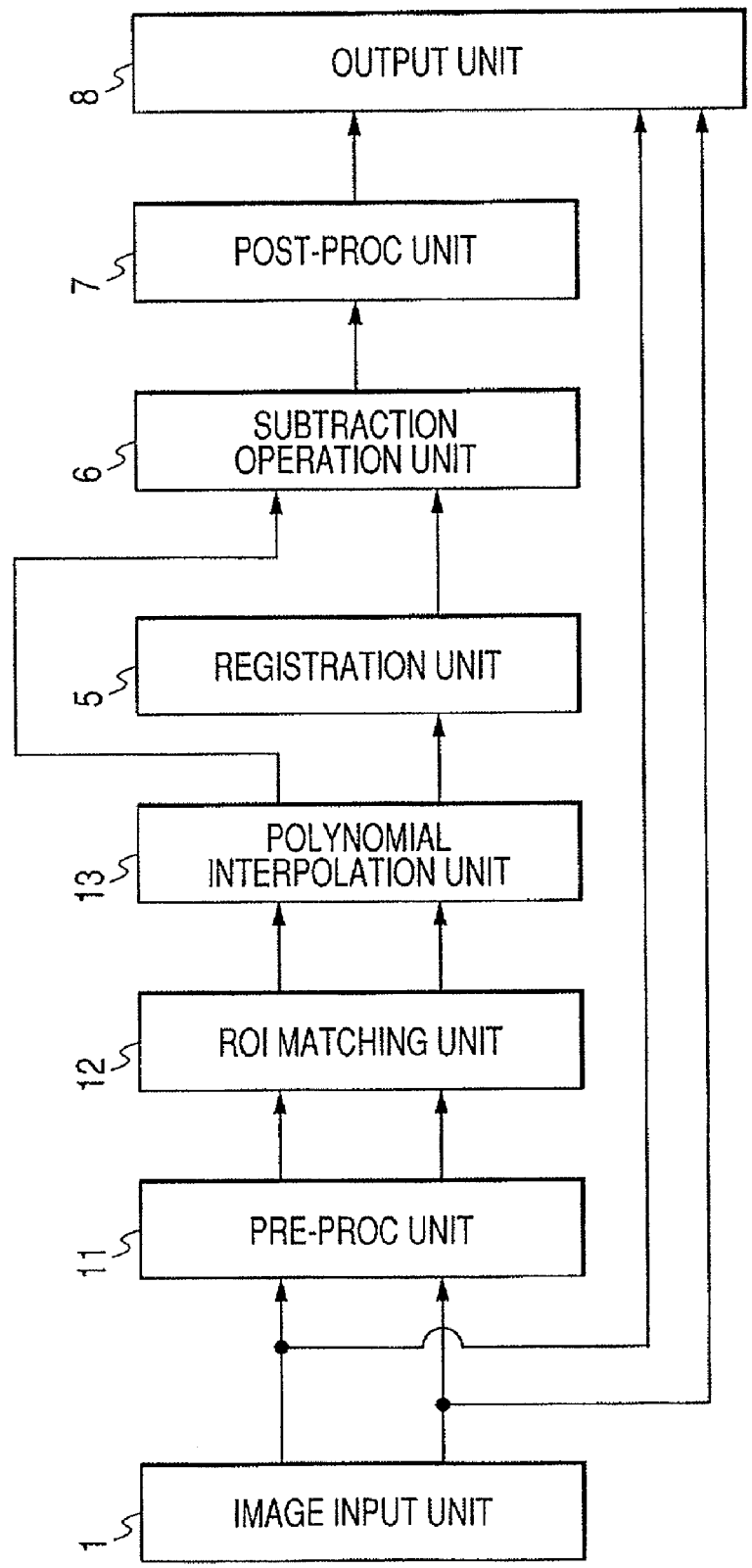
FIG. 25 is a block diagram showing the constitution of a conventional image processing device.

In FIG. 24, the cubic spline interpolation is executed using the horizontal components $x_1^2$ to $x_4^2$ of the shift vector, and the result between the components $x_2^2$ and $x_3^2$ on an interpolation result $SO_2$ is given as the final result of this interval. Then, the same process is executed as shifting the window by one sample, whereby the interpolation results of all the intervals are generated and output. Incidentally, it only has to use the conventional result with respect to both ends of data.

As explained above, according to the eighth embodiment, in addition to the effect of the above fifth embodiment, it is possible, even in a case where the variation of the shift vector is large in the image or the like because it includes many noise components, to suppress a vibration of the interpolation result, whereby it is thus possible to secure accuracy in the registration.

Ninth Embodiment

In the above fifth to eighth embodiments, the cross-correlation coefficient $CC_n$ is used as the weight coefficient in the weighted average process shown by the equation (18). However, another method may be applied.

That is, in the ninth embodiment, the shift vector calculation unit 2 calculates the texture of the image data included in the ROI concerning the shift vector calculation, and outputs the calculated texture to the filter unit 3. Here, although various textures can be used, a change of the pixel value in the ROI is used as the index (that is, complexity of the texture) in the present embodiment. That is, in the present embodiment, the shift vector calculation unit 2 forms the histogram of the template ROI, and sets an image pixel value number $\phi_n$ of which the frequency is non-zero as the texture.

Typically, in the chest front image, contrasts of the mediastinum portion, the heart portion, the diaphragm portion and the like are low, whereby the texture of these portions is low. On the contrary, the texture of the template ROI's set in the lung filed portion and its peripheral portion is high. Therefore, there is a high possibility that the shift vector calculated in the low-texture ROI includes more errors, whereby it is desirable to lower the weight in the filter process of the shift vector.

For this reason, in the ninth embodiment, the filter unit 3 calculates a weight coefficient $w_n$ of the weighted average process based on the equations (22) and (23).

$$w_n = \begin{cases} \Phi_n\left(1-\left(\frac{r_n}{kMAD}\right)^2\right)^2 & |r_n| < kMAD \\ 0 & |r_n| \geq kMAD \end{cases} \quad (22)$$

$$\Phi_n = \frac{\phi_n \cdot CC_n}{\sum_{n=0}^{N-1} \phi_n \cdot CC_n} \quad (23)$$

Here, it should be noted the value $\Phi_n$ calculated by the equation (23) indicates the normalized texture.

As shown by the equation (18), the cross-correlation coefficient used in the calculation of the shift vector is used as the index (or measure) of the weighting in the fifth embodiment. However, as described above, the cross-correlation coefficient indicates a high value even with respect to the portion of which the texture is poor, whereby there is a possibility that a large weight is given to the shift vector including a large error.

Meanwhile, according to the ninth embodiment, the texture (that is, complexity of the texture) in the ROI is used as the index (or measure) of the weighting, whereby a less weight is given to the shift vector located in the portion such as the mediastinum portion, the abdomen portion or the like of which the relevant information amount is small. Thus, it is possible to increase accuracy of the filter process.

Incidentally, the texture in the present embodiment is not limited to the pixel value number of which the frequency is non-zero in the above histogram. That is, other index (or measure) may be used. For example, in a case where the image data in the ROI to be processed is subjected to frequency transformation, a ratio of the high-frequency component of the frequency-transformed image data may be used. Besides, dispersion of the pixel values, kurtosis of the histogram, and the like may be used.

As described above, the embodiments of the present invention are explained in detail. Incidentally, the present invention may be applied to, for example, a system, a device, a method, a program, a storage medium or the like. More specifically, the present invention may be applied to a system consisting of plural instruments or to a device comprising a single instrument.

In any case, the present invention is also applicable to a case where the program (that is, in the above embodiments, the program codes corresponding to the attached flow charts) of software for realizing the functions of the above embodiments is supplied directly or remotely to the system or the device, and the computer in the system or the device thus operates the various devices according to the supplied program to realize the above embodiments.

In this connection, since the functions of the above embodiments are realized by a computer, the program codes themselves installed into the relevant computer realizes the present invention. That is, the computer program itself for realizing the functional process of the present invention is also included in the concept of the present invention.

In that case, if it has the program function, an object code, a program to be executed by an interpreter, a script to be supplied to OS, or the like may be used.

Here, as the storage medium for supplying the program, for example, a flexible disk, a hard disk, an optical disk, a magnetooptical disk, an MO, a CD-ROM, a CD-R, a CD-RW, a magnetic tape, a nonvolatile memory card, a ROM, a DVD (DVD-ROM, DVD-R), or the like can be used.

Besides, as a method of supplying programs, there is a method of connecting with a home page on the Internet by using a browser of a client computer, and downloading the computer program itself of the present invention or a compressed file including an automatic installing function together with the computer program into the recording medium such as a hard disk or the like. Moreover, there is a method of dividing the program codes constituting the program of the present invention into plural files and downloading the respective files from different home pages. That is, a WWW server for downloading the program files for achieving the function processes of the present invention with use of the computer to plural users is included in the scope of the present invention.

Moreover, it is possible to encrypt the program of the present invention, store the encrypted program in a storage medium such as a CD-ROM or the like, distribute the obtained storage media to users, cause the user who has satisfied a predetermined condition to download key information for decrypting the encrypted program from the home page through the Internet, cause the user in question to install the decrypted program into an appropriate computer, and thus achieve the functions of the present invention.

Moreover, the present invention includes not only a case where the functions of the above embodiment are achieved by executing the program codes read by the computer, but also a case where the OS or the like functioning on the computer executes a part or all of the actual process according to instructions of the program codes, whereby the functions of the above embodiment are achieved by that process.

Furthermore, the functions of the above embodiment can be achieved in a case where the program read from the storage medium is once written in a memory provided in a function expansion board inserted in the computer or a function expansion unit connected to the computer, and then a CPU or the like provided in the function expansion board or the function expansion unit executes a part or all of the actual process according to the instructions of the program.

This application claims priority from Japanese Patent Application Nos. 2004-170231 filed on Jun. 8, 2004 and 2005-021827 filed on Jan. 28, 2005, which are hereby incorporated by reference herein.

The invention claimed is:

1. An image processing apparatus which matches a second image to a first image based on a shift vector, comprising:
 a matching degree acquisition unit adapted to acquire a degree of matching of corresponding points corresponding mutually between the first and second images;
 a texture estimation unit adapted to estimate a texture which is the ratio of the absolute value of the whole frequency components and the absolute value of the high-frequency components on the periphery of the corresponding points;
 a shift vector weighting unit adapted to weight the shift vector based on the degree of matching and the estimation of the texture; and
 a deformation unit adapted to deform the second image so as to match the first image based on the weighted shift vector.

2. An image processing apparatus according to claim 1, wherein said texture estimation unit estimates the texture based on geometric information concerning a region of interest set on the corresponding points.

3. An image processing apparatus according to claim 1, wherein said texture estimation unit estimates the texture based on a statistical characteristic amount of a histogram of an image within a region of interest set on the corresponding points.

4. An image processing apparatus according to claim 1, wherein said texture estimation unit estimates the texture based on a ratio of a high-frequency component of an image within a region of interest set on the corresponding points.

5. An image processing apparatus according to claim 4, wherein, in case of estimating the texture, said texture estimation unit executes frequency transformation by Fourier transform, DCT (Discrete Cosine Transform) or wavelet transform, to the image within the region of interest.

6. An image processing apparatus according to claim 1, wherein said texture estimation unit detects an edge of an image within a region of interest set on the corresponding points, and estimates the texture based on an amount of the edge.

7. An image processing apparatus according to claim 1, wherein, in case of mutually correlating the degree of matching and the estimation of the texture with each other, said shift vector weighting unit mutually multiplies an estimation value of the degree of matching and an estimation value of complexity of the texture together, and normalizes a product of the multiplication.

8. An image processing apparatus according to claim 1, wherein, in case of mutually correlating the degree of matching and the estimation of the texture with each other, said shift vector weighting unit normalizes an estimation value of complexity of the texture, and sets a weighted sum of a result of the normalization and the degree of matching to the weight of the shift vector.

9. An image processing method which matches a second image to a first image based on a shift vector, comprising:
 a matching degree acquisition step of acquiring a degree of matching of corresponding points corresponding mutually between the first and second images;
 a texture estimation step of estimating a texture which is the ratio of the absolute value of the whole frequency components and the absolute value of the high-frequency components on the periphery of the corresponding points;
 a shift vector weighting step of weighting the shift vector based on the degree of matching and the estimation of the texture; and
 a deformation step of deforming the second image so as to match the first image based on the weighted shift vector.

10. An image processing method according to claim 9, wherein said texture estimation step is adapted to estimate the texture based on a statistical characteristic amount of a histogram of an image within a region of interest set on the corresponding points.

11. An image processing method according to claim 9, wherein said texture estimation step is adapted to estimate the texture based on a ratio of a high-frequency component of an image within a region of interest set on the corresponding points.

12. An image processing method according to claim 9, wherein said texture estimation step is adapted to detect an edge of an image within a region of interest set on the corresponding points, and estimate the texture based on an amount of the edge.

13. A non-transitory computer-readable storage medium which stores a program for causing a computer to execute an image processing method which matches a second image to a first image based on a shift vector, said program causing the computer to execute:
 a matching degree acquisition procedure to acquire a degree of matching of corresponding points corresponding mutually between the first and second images;
 a texture estimation procedure to estimate complexity of a texture which is the ratio of the absolute value of the whole frequency components and the absolute value of the high-frequency components on the periphery of the corresponding points;
 a shift vector weighting procedure to weight the shift vector as correlating the degree of matching and the complexity of the texture mutually with each other; and
 a deformation procedure to deform the second image so as to match the first image based on the weighted shift vector.

* * * * *